US009034222B2

(12) United States Patent
Koos et al.

(10) Patent No.: US 9,034,222 B2
(45) Date of Patent: May 19, 2015

(54) METHOD FOR PRODUCING PHOTONIC WIRE BONDS

(75) Inventors: Christian Koos, Siegelsbach (DE);
Wolfgang Freude, Karlsruhe (DE);
Nicole Lindenmann, Karlsruhe (DE);
Juerg Leuthold, Walzbachtal (DE)

(73) Assignee: KARLSRUHE INSTITUT FUER TECHNOLOGIE, Karlsruhe (DE)

( * ) Notice: Subject to any disclaimer, the term of this patent is extended or adjusted under 35 U.S.C. 154(b) by 337 days.

(21) Appl. No.: 13/385,505

(22) Filed: Feb. 23, 2012

(65) Prior Publication Data
US 2013/0221550 A1 Aug. 29, 2013

(51) Int. Cl.
*G02B 6/26* (2006.01)
*G02B 6/138* (2006.01)
*G02B 6/30* (2006.01)
(Continued)

(52) U.S. Cl.
CPC ............ *G02B 6/138* (2013.01); *G02B 6/12002* (2013.01); *G02B 6/12004* (2013.01); *G02B 6/26* (2013.01); *G02B 6/305* (2013.01); *G02B 6/1221* (2013.01)

(58) Field of Classification Search
CPC .......... G02B 6/26; G02B 6/136; G02B 6/138; G02B 6/22002
USPC ...................................... 264/1.24, 1.25, 1.27
See application file for complete search history.

(56) References Cited

U.S. PATENT DOCUMENTS

| 6,621,972 B2 | 9/2003 | Kimerling et al. |
| 7,303,339 B2 | 12/2007 | Zhou et al. |
| 8,274,040 B2 | 9/2012 | Zhong et al. |

(Continued)

FOREIGN PATENT DOCUMENTS

| DE | 19545721 C2 | 2/2003 |
| DE | 60114820 T2 | 9/2006 |

(Continued)

OTHER PUBLICATIONS

Lindenmann et al, "Photonic Wire Bonding for Single-Mode Chip-to-Chip Interconnects", 2011 8th IEEE International Conference on Group IV Photonics, Sep. 14-16, 2011, pp. 380-382.*

(Continued)

*Primary Examiner* — James Sanders
(74) *Attorney, Agent, or Firm* — Venable LLP; Robert Kinberg

(57) ABSTRACT

A method for making optical connections with optical waveguides includes mounting the optical waveguides or a device comprising the optical waveguides, on a component carrier. A partial region of the optical waveguides is embedded in a volume of resist material. Positions of the optical waveguides to be connected are detected with reference to a coordinate system using a measuring system. Favorable, three-dimensional geometries are determined for optical waveguide structures for connecting the optical waveguides to each other at predetermined connecting locations and the optical waveguide structure geometries are converted to a machine-readable dataset. The optical waveguide geometries in the volume of the resist material are three-dimensionally structured using a direct-writing lithography device operating on the basis of the machine-readable dataset. The structured resist material is treated using physical or chemical methods to form at least one optical waveguide structure having ends connected to predetermined connecting locations of the optical waveguides.

22 Claims, 13 Drawing Sheets

(51) Int. Cl.
*G02B 6/12* (2006.01)
*G02B 6/122* (2006.01)

(56) References Cited

U.S. PATENT DOCUMENTS

| | | |
|---|---|---|
| 2004/0071380 A1 | 4/2004 | Wiesmann et al. |
| 2005/0129366 A1 | 6/2005 | Yasaitis |
| 2008/0044126 A1 | 2/2008 | Costa et al. |
| 2010/0075393 A1* | 3/2010 | Shear et al. ............ 435/192 |
| 2010/0111470 A1 | 5/2010 | Assefa et al. |
| 2011/0278441 A1 | 11/2011 | Vermeulen et al. |
| 2012/0002296 A1 | 1/2012 | Costa et al. |
| 2013/0214439 A1* | 8/2013 | McLeod ............ 264/1.27 |

FOREIGN PATENT DOCUMENTS

| | | |
|---|---|---|
| DE | 60130531 T2 | 6/2008 |
| DE | 102007038642 A1 | 2/2009 |
| DE | 102007055530 A1 | 5/2009 |
| EP | 0689067 A2 | 12/1995 |
| WO | WO-2009/021256 A1 | 2/2009 |

OTHER PUBLICATIONS

Lindenmann, et al.: 'Photonic Waveguide Bonds—A Novel Concept for Chip-to-Chip Interconnects,' Proc. Optical Fiber Communication Conference (OFC'11), Los Angeles (CA), Paper PDPC1, Mar. 6-10, 2011.

Lindenmann, N et al..; Photonic Wire Bonding for Single-Mode Chip-to-Chip Interconnects, 8th International Conference on Group IV Photonics, London, England, Sep. 14-16, 2011; paper FD2.

Lindenmann, N. et al.; "Photonic wire bonds for terabit/s chip-to-chip interconnects;" arXiv: 1111.0651v1 [physics.optics], 2011.

Schmid, G.; Leeb, W.; Langer G.; Schmidt, V & Houbertz, R., "Gbit/s transmission via two-photon absorption-inscribed optical waveguides on printed circuit boards;" *Electronic Letters*, 2009, pp. 45, 219-221.

Schmidt, V; Kuna L.; Satzinger, V.; Houbertz, R.; Jakopic, G. & Leising G.; "Application of two-photon 3D lithography for the fabrication of embedded ORMOCER waveguides;" *Porc. SPIE*, vol. 6476, 2007.

Houbertz, R.; Satzinger, V.; Schmid V.; Leeb, W. & Langer, G.; "Optoelectronic printed circuit board: 3D structures written by two-photon absorption; Organic 3D Photonics Materials and Devices II," *SPIE Int. Soc. Optical Engineering*, 2008, Proceedings vol. 7053, B530-B530.

Houbertz, R; Wolter, H.; Dannberg, P; Serbin, J. & Uhlig, S.; "Advanced packaging materials for optical applications: bridging the gap between nm-size structures and large-area panel processing;" Art. No. 612605, *Photonics Packaging and Integration VI*, 2006, pp. 6126, 12605-12605.

* cited by examiner (a)

(b)

METHOD FOR PRODUCING PHOTONIC WIRE BONDS

BACKGROUND

1. Technical Field

The invention relates to the field of micro-optics and nano-optics, and more particularly relates to waveguide structures for optical interconnection of planar-integrated photonic systems (chip-chip connections) and the connection of planar integrated photonic systems to glass fibers (fiber-chip connection). The invention furthermore relates to a method and a device for producing the waveguide structures.

The field of integrated optics, in particular the area of silicon photonics, meaning the integration of waveguide-based photonic components on silicon or silicon-on-insulator (SOI) substrates, has been the subject of intensive research and development work for several years. This technology permits transferring mature CMOS (complementary metal oxide semiconductor) processes, developed for mass production of integrated electronic circuits, to the integrated photonic. Nano-photonic systems with high complexity and a plurality of functionalities can thus be integrated into the smallest possible space and produced on an industrial scale. The areas of application for such systems are primarily in the field of data transmission, as well as for optical measuring technology and sensing technology. The economic potential of silicon photonics is high and first products are already commercially available.

However, the design and connection technology for integrated photonic systems has increasingly proven to be an obstacle for further commercialization. Complex photonic systems are based on lateral single-mode planar integrated waveguides. Waveguide structures are called "lateral single mode" for which in each polarization only the basic mode can propagate. Lateral single-mode waveguides thus generally have two guided modes with different polarizations, for example called "quasi TE" and "quasi TM". A low-loss optical connection of these systems is therefore only possible with waveguide structures which permit an efficient connection to the basic modes of the integrated waveguide. For the optical connection of integrated photonic systems, standard single-mode fibers are generally used which are affixed directly to the chip, using a high number of manual operational steps. This leads to a correspondingly low integration density of optical chip-to-chip connections and results in high packaging costs which, in part, amount to more than 50% of the total costs for the system. In the field of microelectronics, the development of reliable "wire bonding" techniques was a basic requirement for economic success. Methods with a comparable throughput and degree of automation have so far not been available for the field of photonics.

For connecting integrated optical components, passive positioning methods are primarily used for which a transmitter chip as well as a receiver chip must be positioned with corresponding devices and sufficient precision, relative to the waveguide. The precision requirements are for the most part determined by the cross-sectional surfaces of the waveguides. Thus, systems are often preferred for the mass production of systems which are based on multi-modal waveguides with large cross-sectional surfaces. In recent years, techniques have been developed which permit, for example, a multi-modal connection of surface-emitting laser sources (so-called vertical cavity surface emitting lasers (VCSEL)) on a transmitter chip with planar integrated photo detectors on a receiver chip.

However, these methods cannot be used for connecting lateral single-mode integrated optical waveguides. Waveguide diameters in the field of silicon photonics typically are noticeably below 1 μm. The resulting precision requirements cannot be met satisfactorily with adjustment techniques only.

Further, over the last years, several photonic integration platforms have gained maturity, each of them having individual strengths and weaknesses. III-V-compound semiconductors have become the mainstay for optical sources and amplifiers, whereas silicon photonics enables efficient co-integrating of modulators and detectors together with WDM functions, and optical waveguides based on silicon nitride are used for high-performance passive devices. However, there is currently no flexible and cost-effective method that could combine these technologies into a joint module.

Single-mode integrated optical components are presently connected almost exclusively with the aid of single-mode fibers which are connected directly to the end face of an integrated waveguide. In the process, the fibers and the waveguide facets must be positioned and attached with high precision, relative to each other. As a rule, this is achieved by measuring the optical coupling efficiency during the alignment and by maximizing the positioning of the fiber tip, wherein this is also referred to as "active alignment." The mode field adaptation between the single-mode fiber and the integrated waveguide as a rule occurs by giving the fiber tip a special form which ensures a focusing of the exiting light (so-called "lensed fibers"). In addition, integrated optical tapers are often used which optimize the coupling efficiency between the focused mode field for the single-mode fiber and the integrated waveguide.

This method was developed for individual fiber-chip connections which are not scalable for a large number of optical connections and can therefore no longer meet the requirements of a high-quality integrated photonic system. The geometric dimensions of standard single-mode fibers (diameter approximately 125 μm), for example, limit the achievable integration density. In addition, the high expenditure for an active adjustment is no longer acceptable for the mass production of integrated optical systems. The active adjustment with passive integrated optical systems is furthermore difficult since these systems do not contain an inherent light source which would allow detecting and optimizing the coupling efficiency during the adjustment operation. Passive adjustment methods continue to suffer from poor reproducibility of the coupling efficiency. Furthermore problematic are the generally high optical losses with chip-fiber couplings (50% are no rarity) which, above all, can be traced back to poor mode field adaptations between the single-mode fiber and the integrated waveguides. Since the integrated waveguides generally are planar structures, a mode field adaptation frequently is possible only in the substrate plane.

2. Prior Art

German patent document DE 10 2007 055530 A1 describes a method for laser-beam processing of a work piece. Among other things, the specification discloses a method for finding planar surfaces within the work piece to be processed. Three-dimensional structures cannot be detected with this method and the production of waveguides as well as their connection to pre-positioned structures is not mentioned therein.

German patent document DE 601 14 820 T2 describes use of multi-photon induced photo structuring methods for producing three-dimensional optically functional structures in polymer or oligomer materials. The description is concentrated on the lithography methods and the resist materials.

The adaptation and connecting of the generated structures to pre-positioned components is not mentioned.

German patent document DE 601 30 531 T2 describes production of optical waveguides of a light-hardening resin. The description is focused on the sequences of different illumination steps, which are used to define the core region and the sheath region of the waveguide. The resins here are structured along the propagation direction for a light beam. The waveguides thus consist of a series of, and in some parts straight, sections. Free form curves with variable waveguide cross sections cannot be created with this method. Accordingly, the problem definition upon which the present invention is based cannot be solved this way.

German patent document DE 10 2007 038 642 A1 describes three-dimensional structuring of waveguides with variable cross-sectional geometries in propagation direction by using multi-photon processes. A local increase of the refractive index, induced by the radiation, is used for the light guidance. The consequently achievable index contrast is low (typically 0.005), so that realization of compact photonic wire bonds is not possible with this method. The adaptation and/or the connection of the waveguide structures, generated in this way, to pre-positioned optical components is not the subject matter of the specification.

International patent application publication WO 2009/021256 A1 describes a method for producing optical waveguides on polymer substrates. The specification concentrates on the lithographic method and the resist materials, wherein the three-dimensional structuring with the aid of two-photon absorption processes is also mentioned. The adaptation and/or the connection to the waveguide structures, generated in this way, to pre-positioned optical components is not part of the subject matter of the specification.

European patent document EP 0 689 067 A2 describes a method for the optical structuring of connecting waveguides between pre-positioned components. The light beam used for the structuring is radiated directly from the ends of the waveguides to be connected into a non-linear optical material. In regions of high optical intensity, meaning along the light rays and in particular at the crossing points of light rays, an optically induced polymerization reaction takes place, which leads to forming waveguide structures along the paths for radiating in light. These waveguide structures are oriented per definition on the optical elements to be connected, but the waveguide geometries that can be created with this method are strongly limited. In particular, it is not possible to generate pre-computed and optimized free-form waveguides. The achievable index contrast is furthermore very low and the components to be connected must be positioned, relative to each other, with high accuracy. The use of passive components is furthermore also made more difficult in that these are frequently not transparent for single-photon processes at the lithographic wavelength. The use of multi-photon polymerization processes in most cases fails because the required capacities frequently cannot be transported in passive structures. The problem definition upon which the present invention is based cannot be solved with this method.

German patent document DE 19545 721 C 2 describes a method for producing optical micro-components on fiber end surfaces and/or laser facet. For this, the position of the region where the optical micro-component is to be generated is first detected with an imaging method. Based on the data obtained, the optical micro-component is then generated with high relative accuracy on the fiber end surface or the laser facet. The term optical micro-component in this case refers to lenses or prisms. The connection and geometric adaptation of waveguides on pre-positioned optical components is not mentioned and is not feasible with this method since the described imaging method does not permit the three-dimensional position detection. The described method thus cannot be used to solve the problem defined for the present invention.

Schmid, G.; Leeb, W.; Langer G.; Schmidt, V & Houbertz, R., "Gbit/s transmission via two-photon absorption-inscribed optical waveguides on printed circuit boards;" *Electronic Letters,* 2009, pp. 45, 219-221 discloses the production and function demonstration of a multimode waveguide produced in a volume of a resist material and/or a multi-core waveguide which connects a VCSEL (vertical cavity surface emitting laser) and a photodiode. With the integrated components to be connected, light is coupled in and coupled out via the surface of the substrate. The problem of connecting to a single-mode planar integrated waveguide does not arise with this method. The problem upon which the present invention is based thus cannot be solved with the above-described method. The structure described therein furthermore has a very low refractive index (estimated at 0.005) which does not allow reaching the high integration density required for photonic wire bonds.

Schmidt, V; Kuna L.; Satzinger, V; Houbertz, R.; Jakopic, G. & Leising G.; "Application of two-photon 3D lithography for the fabrication of embedded ORMOCER waveguides;" *Porc. SPIE*, Vol. 6476 discloses the production of waveguide structures with two-photon polymerization. The waveguides are based on a local increase in the refractive index which is induced by the radiation. The waveguides connect VCSELs with the associated photodiodes. The diameter of the waveguides is described as measuring "tens of microns" and it may be assumed that multimodal waveguides are used here as well which is confirmed by the intensity distribution shown in the publication. The described waveguides are therefore in principle not suitable for connecting single-mode integrated optical components. Accordingly; connecting of embedded waveguides to planar integrated lateral single-mode waveguide structures is not taken into consideration. The low refractive index difference furthermore results in extremely large structures (length of waveguide 2-12 cm), which gives reason to assume correspondingly large radii for the waveguide curvatures. The integration density necessary for photonic wire bonds cannot be achieved with this method. The specification furthermore discloses that the complete waveguide cross section is generated during a single writing passage. For this purpose, a telescope composed of cylindrical lenses is arranged in the beam path which allows a corresponding adaptation of the shape of the focusing region in the resist material. From this it can be assumed that the spatial resolution that can be achieved with the aforementioned arrangement is in the range of 10 μm, which prevents an efficient optical connection of the generated structures to lateral single-mode, planar integrated waveguides. The production method described in the publication furthermore contains a position detection of the optical components to be connected with the aid of a so-called "machine vision system." A CCD camera is therefore used for the lateral position detection and is installed adjacent to the microscope objective. The accuracies which can be achieved with this arrangement are limited and, at best, should amount to a few micrometers. This is sufficient for multimodal connection waveguides. However, the connecting of single-mode connection waveguides to pre-positioned components is not possible with this system for lack of accuracy. In the axial direction, the machine-vision system only detects the position of the sample surface with the aid of a confocal arrangement. A three-dimensional position detection of components embedded in the resist material is not intended and, accordingly, this arrangement cannot be used to generate waveguide structures which are connected directly and with high precision to planar integrated waveguide-based components. The measured insertion loss for waveguides produced in this way amounts to 7.8 dB, wherein such high values cannot be tolerated when connecting nano-photonic systems.

Houbertz, R.; Satzinger, V; Schmid V; Leeb, W. & Langer, "Optoelectronic printed circuit board: 3D structures written by two-photon absorption; Organic 3D Photonics Materials and Devices II," *SPIE Int. Soc. Optical Engineering,* 2008, Proceedings Vol. 7053, B530-B530 is closely connected to the above-discussed publication. It describes the production of waveguide structures for connecting pre-positioned components. A local increase of the refractive index, induced by a two-photon process, is used also in this case to define waveguide structures. The resulting structures, however, have extremely large cross sections and are therefore multimodal and not suitable for solving the object of the present invention. The waveguides furthermore have a low index contrast and correspondingly large curvature radii and therefore cannot meet the requirements for photonic wire bonds with respect to the integration density. Again, the lateral position of the components to be connected is detected with the aid of a camera installed adjacent to the microscope objective. The position detection in axial direction is limited to the detection of the upper edges of the VCSEL and photo diode chips which are fixated perpendicular to the surface of the component carrier. It can be assumed that the relative position accuracies which can be achieved with this arrangement are not sufficient for connecting single-mode planar integrated waveguides having cross sections of only a few micrometers. The generated waveguide structures furthermore cannot be connected directly to the surface of the chips—the waveguides end (start) at a distance of approximately 10 μm to the photodiode (the VCSEL). Technical reasons for this are not disclosed and it has be assumed that the shadowing effects caused by the vertically mounted chips play a role. The above-described arrangement cannot be used for producing photonic wire bonds which can be connected directly via corresponding connecting structures to planar integrated waveguides.

Houbertz, R; Wolter, H.; Dannberg, P; Serbin, J. & Uhlig, S.; "Advanced packaging materials for optical applications: bridging the gap between nm-size structures and large-area panel processing;" Art. No. 612605, *Photonics Packaging and Integration VI,* 2006, pp. 6126, 12605-12605 discusses inorganic-organic hybrid polymers (so-called ormoceres) with the associated structuring methods based on two-photon polymerization and their uses for the optoelectronics. Discussed as example, among other things, is the production of optical components with two-photon polymerization, wherein it is mentioned as an advantage that these components can be realized on substrates which already contain pre-structured components such as VCSELs or micro-lenses. However, the publication does not discuss the coupling of TPP structured waveguides with integrated optical waveguides. The waveguides described therein are multimodal and thus cannot be coupled without loss to single-mode planar integrated waveguides. The problem defined for the invention therefore cannot be solved with the methods described in this publication.

SUMMARY OF THE INVENTION

An object of the invention is to provide a technology which permits a low-loss optical connection of lateral single-mode, planar integrated photonic systems.

It is a further object of the invention to provide an optical waveguide structure that can be freely designed in three dimensions. Such optical waveguide structures are also referred to herein as photonic wire bonds (PWB). Photonic wire bonds are intended to permit high integration densities while, simultaneously, allowing an economic production with large piece numbers.

In addition to the provision of optical waveguide structures (photonic wire bonds), it is furthermore an object to provide a method and a device for automated production of such optical waveguide structures.

The above and other objects are accomplished according to the invention by the provision of an optical arrangement, which in one embodiment, includes a method for making optical connections with optical waveguides, comprising: mounting the optical waveguides, or a device comprising the optical waveguides, on a component carrier; embedding at least a partial region of the optical waveguides in a volume of resist material; detecting positions of the optical waveguides to be connected with reference to a coordinate system using a measuring system; determining favorable, three-dimensional geometries for optical waveguide structures for connecting the optical waveguides to each other at predetermined connecting locations and converting the optical waveguide structure geometries to a machine-readable dataset; three-dimensional structuring of the optical waveguide geometries in the volume of the resist material using a direct-writing lithography device operating on the basis of the machine-readable dataset; and treating the structured resist material using at least one of physical methods and chemical methods to form at least one optical waveguide structure having ends connected to respective predetermined connecting locations of the optical waveguides.

Thus, the production method according to the invention comprises the three-dimensional position detection for the photonic systems to be connected, the determination of favorable waveguide geometry, and the definition of the waveguide structure with a direct-writing lithographic method. A measuring unit and direct-writing lithographic unit may operate in a joint machine coordinate system to thus allow defining three-dimensional waveguide structures which are oriented precisely on pre-positioned, integrated optical components.

DETAILED DESCRIPTION

Figure 1:
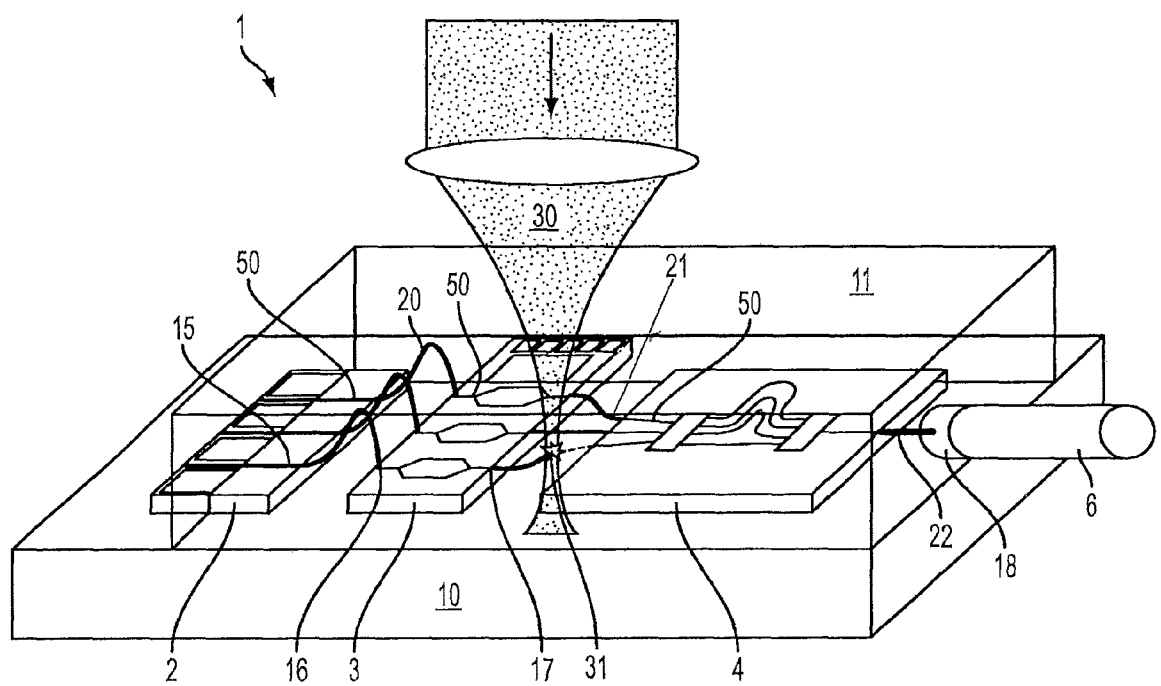
FIG. 1 is a three dimensional see-through schematic showing the principles of the invention.
Figure 2:
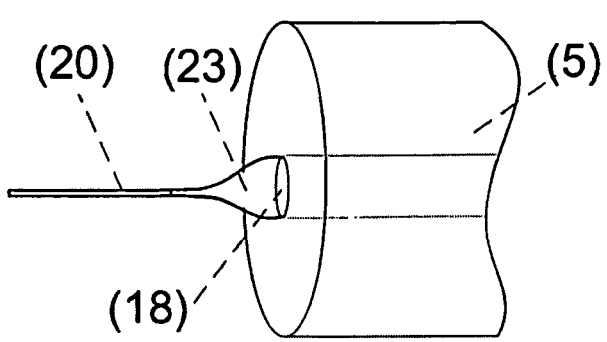
FIGS. 2a and 2b are partial schematic views of different embodiments of a connecting structure as part of an optical waveguide structure to connect the latter to a lateral, single mode waveguide on a chip.
Figure 2:
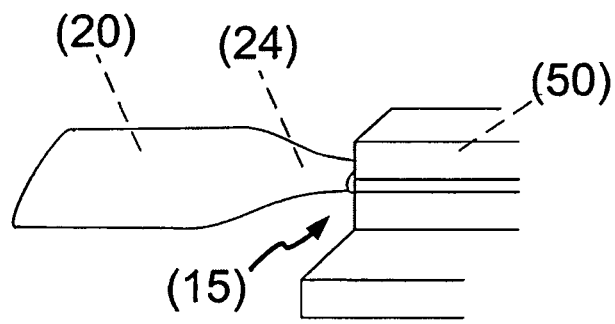

In the drawings, like reference numbers are used to denote like components in the different figures.

The waveguide structures upon which the invention is based are intended for the low-loss optical connection of lateral single-mode planar integrated photonic systems. The functional principle of the invention is explained with the example of the arrangement illustrated in FIG. 1. The optical arrangement (1) consists of several photonic systems that are planar integrated on different substrates (2-4) ("chips") and which contain lateral single-mode waveguides (50). The waveguides (50) positioned on different chips are to be interconnected and/or are to be connected to output and input waveguides (5-6) (see also FIGS. 12-15), only input/output waveguide (6) being shown in FIG. 1. For this, the elements (2-6) to be connected are mounted on a component carrier (10) and are covered at least partially with a resist material (11). Each of the elements to be connected comprises optical connecting points (15-18) to which the connecting optical waveguide structures, also referred to herein as photonic wire bonds, (20-22) are attached. The precise position of the elements to be connected and connecting points is detected with a measuring system. Based thereon, a favorable geometry is determined for the connecting waveguides which permits, for example, a single-mode operation with the lowest possible propagation losses. This geometry is converted to a digital dataset and the structuring of the connecting optical waveguides structures (20, 21, 22) then occurs in the volume of the resist material in accordance with this dataset and with the aid of a direct-writing lithographic method. This method can be based on polymerization reactions induced in the focused beam of a short-pulse laser (30) through multi-photon processes. In a further processing step, the structures defined in this way can be exposed through developing the resists material and can be operated as freestanding waveguides with the ambient air functioning as cladding material. However, following the development they can also be embedded in low-refractive cladding materials and in this way can be stabilized mechanically or protected against physical and chemical environmental influences.

There are numerous materials that can be used for the component carrier (10), depending on the application. In a simple case, it could, e.g., just be a piece of metal that acts as a mechanical carrier and as a heat sink for the optical devices. The chips are then directly contacted by metal wire bonds for electrical connections. Alternatively, a silicon substrate can be used as a carrier. This substrate can be equipped with electrical circuitry ("intelligent CMOS substrate"), power distribution lines and other structures micro-electro-mechanical devices (MEMS). When used for sensor applications, the carrier may consist of a polymer substrate that also contains microfluidic devices. For on-board optical interconnects, a polymer-based optoelectronic PCB can serve directly as a carrier. Photonic wire bonds are then used to connect on-chip devices to board-level interconnect waveguides, hence avoiding high-precision alignment in the board assembly process. Alternatively, dedicated optoelectronic carriers can be used as an intermediate platform that carry several optoelectronic devices and that are mounted to the optoelectronic board. Photonic wire bonds can then be used both for connecting the on-chip devices to the carrier and for optically connecting the carrier to the board. In some cases it might be beneficial to choose a carrier material for which the thermal expansion coefficient is similar to that of the optical chips.

Photonic wire bonding is mainly a back-end-of-line-technology (BEOL), i.e., it is usually applied to chips that already have left the CMOS manufacturing process. For many applications, it is hence not necessary to use carrier materials that are compatible with CMOS processing.

The photonic wire bonds (20-22) produced according to this principle can have a nearly optional three-dimensional shape which, in particular, can also be adapted to the position and orientation of the planar integrated waveguides to be connected. A highly precise positioning of integrated optical components is thus no longer needed and the automatic production of photonic wire bonds is made possible in high piece numbers. The index contrast can be freely adjusted over a large range when selecting a suitable cladding material. Extremely compact connection waveguides with small curve radii and high integration densities, in particular, can be realized in this way.

A measure for the optical losses, caused by the photonic wire bonds, is the waveguide-dependent insertion loss which is measured between the basic modes of the planar integrated lateral single-mode waveguides (50, 51, 52, 53, 54) to be connected (see FIGS. 1-5). This loss should preferably measure less than 6 dB, especially preferred less than 4 dB and particularly preferred less than 2 dB. These values should advantageously be maintained over an optical band width of more than 30 nm, especially more than 100 nm and particularly preferred more than 300 nm, wherein high integration densities and an efficient production with high piece numbers should also be possible. The minimum distance between two photonic wire bonds which can be realized on the same substrate is advantageously less than 200 µm, especially less than 30 µm and particularly preferred less than 10 µm. Methods disclosed in the prior art do not meet these requirements. In the following, various features of the invention are explained further which allow overcoming the restrictions according to the prior art.

The three-dimensional form of the photonic wire bonds (20, 21, 22) is adapted to the spatial position of the planar waveguides to be connected (50, 51, 52, 53, 54). In contrast to planar integrated waveguide structures, photonic wire bonds are distinguished by a course or path that differs from the integration plane of the planar waveguides to be connected (see FIG. 1). As a result, a coupling in and coupling out via the substrate surface is possible, as well as to overcome the height differences between the surfaces of different substrates.

Compact optical waveguide structures (20, 21, 22) furthermore require small curvature radii. To keep radiation losses to a minimum, a sufficiently high index contrast $\Delta n = n_1 - n_2$ is required between the refractive index $n_1$ in the core of the waveguide and the refractive index $n_2$ in the sheath for the waveguide. For wavelength ranges between 1300 nm and 1600 nm, the refractive index of the sheath material is preferably between 1 and 2.8, especially between 1.2 and 1.8 and preferably between 1.3 and 1.6. The minimum requirement for the index contrast should be that the insertion losses for an 180° turn with 4 mm curve radius measures less than 1 dB. For this, the refractive index contrast Δn between core and sheath region of the photonic wire bond must measure at least 0.01. However, the index contrast should preferably be higher than 0.05 and especially higher than 0.15. With freestanding structures, the Δn can even amount to more than 0.3. However, with high index contrasts the requirements to be met by the structuring method can increase strongly (resolution, achievable surface roughness). In general, the possible minimum curvature radii depend on the index contrast and the cross-sectional geometry of the photonic wire bond. The optical waveguide structures (20, 21, 22) are designed such that local curvature radii of preferably less than 10 mm or 5 mm, especially less than 500 μm and especially preferred less than 50 μm can be realized. In individual cases, the curvature radii can be even less than 10 μm.

A low-loss optical connection between the lateral single-mode waveguides (5, 6, 50, 51, 52, 53, 54) connected to the photonic wire bonds can be achieved, for example, with waveguide structures (20, 21, 22) which are also single mode, wherein the lateral dimensions of the waveguide core must be selected to be sufficiently small. The maximum core diameter 2a (see FIG. 5) in this case depends on the refractive indexes in the core and sheath region. With wavelengths in the range of 1550 nm and straight or nearly straight waveguide sections having circular or nearly circular cross sectional geometries, the lateral core diameter preferably measures less than 10 μm or 7 μm, especially less than 5 μm and in particular less than 3 μm. With freestanding structures having a high index contrast, the core diameter can even be less than 1.6 μm. With wavelengths in the range of 1300 nm, these dimensions are preferably reduced to less than 8 μm or 6 μm, especially preferred less than 4 μm and in particular less than 2.5 μm, wherein for freestanding structures it can be less than 1.3 μm.

A low-loss optical, connection, however, can also be obtained with lateral multi-mode waveguide structures (20, 21, 22). In that case, it must be ensured with the aid of connecting structures (23, 24, 55, 56, 57, 58, 59) and/or with a suitable waveguide shape that a low-loss transformation occurs between the basic modes of the lateral single-mode waveguides (5, 6, 50, 51, 52, 53, 54) connected to the photonic wire bond, wherein a numerical optimization of the waveguide structure is generally required for this. For example, multimode interference (MMI) effects in the photonic wire bond (20, 21, 22) can be utilized purposely for this. Alternatively, a suitable design of the connecting structures (23, 24, 55, 56, 57, 58, 59) can also be used to ensure that the basic modes of the single-mode waveguides (5, 6, 50, 51, 52, 53, 54) will only excite the basic mode of an intrinsically multimode photonic wire bond.

With curved waveguide sections, the wave guidance can also take the form of a so-called whispering gallery mode which propagates along a convex interface between a core material and the sheath material. The single-mode wave guidance is possible in that case, even if the lateral dimensions are clearly above the aforementioned values (see FIG. 5) and/or if the waveguide is defined only by the curved outside contour; see FIG. 6. Typical lengths for the waveguide structures (20-22) are between 10 μm and 30 mm, especially between 30 μm and 3 mm and in particular between 50 μm and 1 mm.

The connecting structures (23, 24, 55, 56, 57, 58, 59) ensure a low-loss transition between the photonic wire bond (20, 21, 22) and the connected single-mode waveguides (5, 6, 50, 51, 52, 53, 54). In particular this is important if the planar integrated photonic subsystems to be connected are based on semi-conductor optical waveguides with high refractive index contrast and correspondingly small mode field diameters of a few hundred nanometers while the connecting waveguides are characterized by small to average index contrasts and correspondingly higher mode field diameters of up to several micrometers. The design of the transition between a planar integrated waveguide (50, 51, 52, 53, 54) and a photonic wire bond (20-22) strongly depends on the respective cross-sectional geometries. With sufficiently small differences for the index contrasts, a coupling can be realized simply with a tapering or expanding taper section (23, 24) in the connecting waveguide (see FIGS. 2(a) and 2(b). With high index contrasts, special structures for adapting the mode field must also be provided on the side of the integrated waveguide (see FIGS. 3(a), 3(b), 3(c), 3(d) and 4(a), 4(b).

Figure 3A:
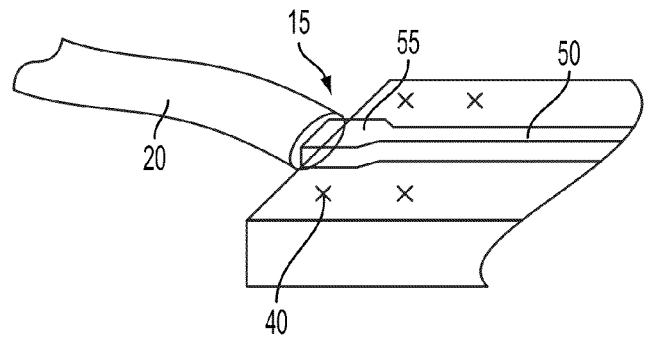
FIGS. 3a to 3d are partial schematic views of different embodiments of a connecting structure as part of a lateral, single mode waveguide on a chip by which an optical waveguide structure is connected to the waveguide on the chip
Figure 3B:
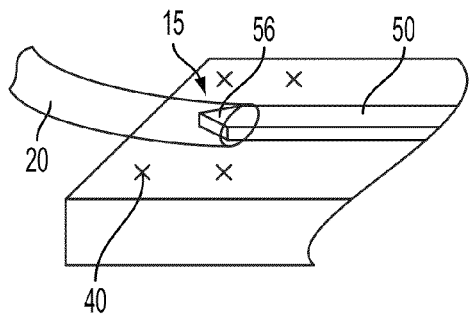
Figure 3C:
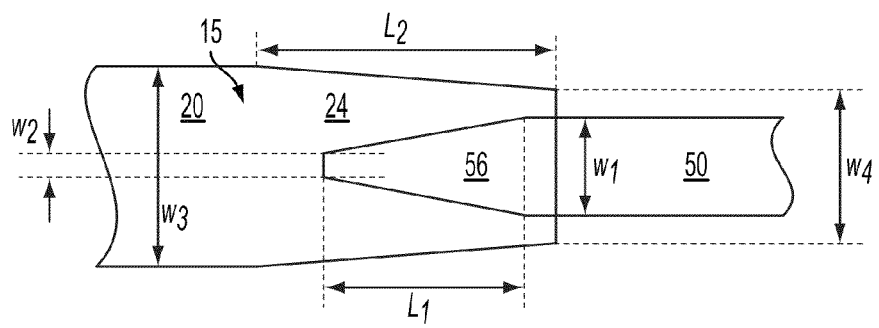
Figure 3D:
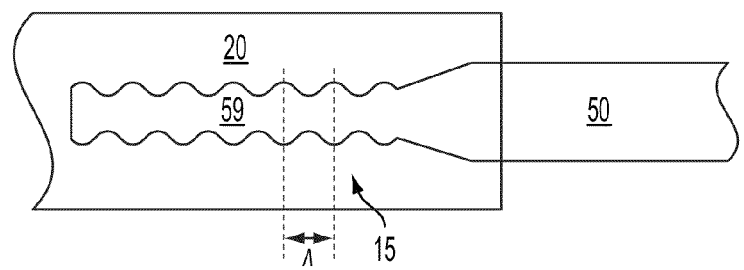
Figure 4:
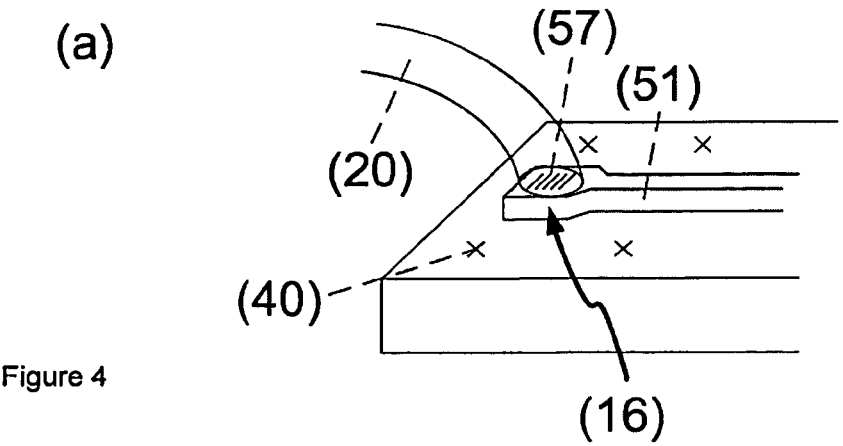
FIGS. 4a and 4b are partial schematic views of different embodiments of connecting structure in the form of grating structures to connect an optical waveguide structure to a lateral, single mode waveguide on a chip.
Figure 4:
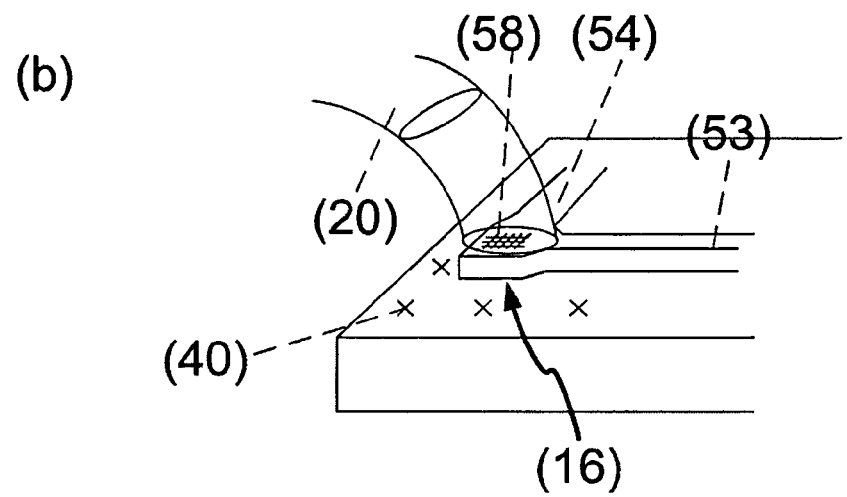

FIG. 2(a) outlines the example of a connecting waveguide (20) with an expanding taper section (23), which results in a mode field adaptation to a standard single-mode fiber (50) with small index contrast. Mode field adaptations to integrated waveguides (50) with high index contrast can be achieved by a design where the taper section narrows (24) as shown in FIG. 2(b). In addition, planar integrated waveguides (50, 51, 52, 53, 54) can also be provided with connecting structures which influence the mode field diameter and/or the propagation direction for the light at the connecting location. FIG. 3(a), for example, shows an example of a planar integrated waveguide (50) for which the mode field is expanded by a tapered structure (55) in one direction and is thus adapted to an adjoining connecting waveguide (20). An expansion of the mode field can also be achieved with a narrowing tapered waveguide structure (56) (a so-called "inverse taper") as shown in FIGS. 3(b) and 3(c)). Alternatively, as shown in FIG. 3(d) a periodic structure (59) can also be used for coupling the guided modes of the integrated waveguide (50) into the connecting waveguide (20). The form, periodicity and length of the connecting structure are selected so as to ensure the most efficient mode conversion.

The inverse taper shown schematically in FIGS. 3(b) and 3(c) represents a preferred connecting structure for the connection between a photonic wire bond (20) and a planar integrated silicon-on-insulator (SOI) strip waveguide (50). The refractive index in the core of the silicon waveguide in this case is approximately 3.48 for a wavelength of 1550 nm. As a rule, the waveguide has a nearly rectangular cross section with a preferred height between 200 nm and 500 nm, especially between 200 nm and 350 nm. The width $w_1$ of the integrated waveguide (50) is preferably between 200 nm and 800 nm, especially preferred between 300 nm and 500 nm. In the connecting structure (56) embodied as inverse taper to the photonic wire bond (20), this width is reduced to values $w_2$ of preferably less than 120 nm, especially less than 80 nm and in particular less than 60 nm. The length $L_1$ for the inverse taper is preferably between 10 μm and 400 μm, especially preferred between 15 μm and 200 μm and in particular between 20 μm and 120 μm. The photonic wire bond (20) has a width $w_3$ which preferably ranges from 0.5 μm to 10 μm, especially preferred from 1 μm to 5 μm and in particular from 1.5 μm to 4 μm. The width $w_4$ for the taper (24) is preferably smaller than or equal to the width $w_3$ and is larger than or equal to $w_1$. Numerical values for $w_4$ therefore are preferably between 200 nm and 10 μm, especially preferred between 300 nm and 4 μm and in particular between 500 nm and 2 μm. The length $L_2$ of the taper (24) is preferably between 10 μm and 400 μm, especially between 15 μm and 200 μm and in particular between 20 μm and 120 μm.

For the periodic connecting structure shown in FIG. 3(d), the period length Λ with an operating wavelength of approximately 1550 nm preferably amounts to more than 680 nm, especially more than 750 nm and especially preferred more than 950 nm. For a wavelength of 1300 nm, these values are reduced to 570 nm, 630 nm and 800 nm.

A connecting waveguide (20) can furthermore be connected to a planar integrated waveguide (50) via a grating structure (57) as shown in FIG. 4(a). The grating causes the light to be radiated at a large angle, relative to the substrate plane, so that the connecting waveguide (20) can be led away in a space saving manner directly toward the top, similarly to a bond wire used in the electrical design and connection technology. With a grating (58) that is structured in two directions, the two linear polarization states of the optical connecting waveguide can be divided into identical polarization states for two different planar waveguides (53) and (54) as shown in FIG. 4(b). Dual structures of this type can be of critical importance for future optical communication systems, in which both polarizations are used for the data transfer.

For an efficient connection of the photonic wire bond (20) via grating structures (57, 58), the grating must have a certain minimum number of elements that repeat periodically per se. The number of periodically repeating grating elements preferably is between 4 and 40, especially between 6 and 30 and particularly preferred between 8 and 25. The grating elements can repeat in one (FIG. 4(a) or two directions (Figures (b)). The total length and/or width of the grating preferably measures between 1 μm and 20 μm, especially between 2 μm and 16 μm and especially preferred between 3 μm and 10 μm. The radiation angle is preferably between 0° and 45°, especially between 5° and 30° and particularly preferred between 5° and 15° (respectively measured relative to the direction of the normal to the substrate plane).

Figure 12:
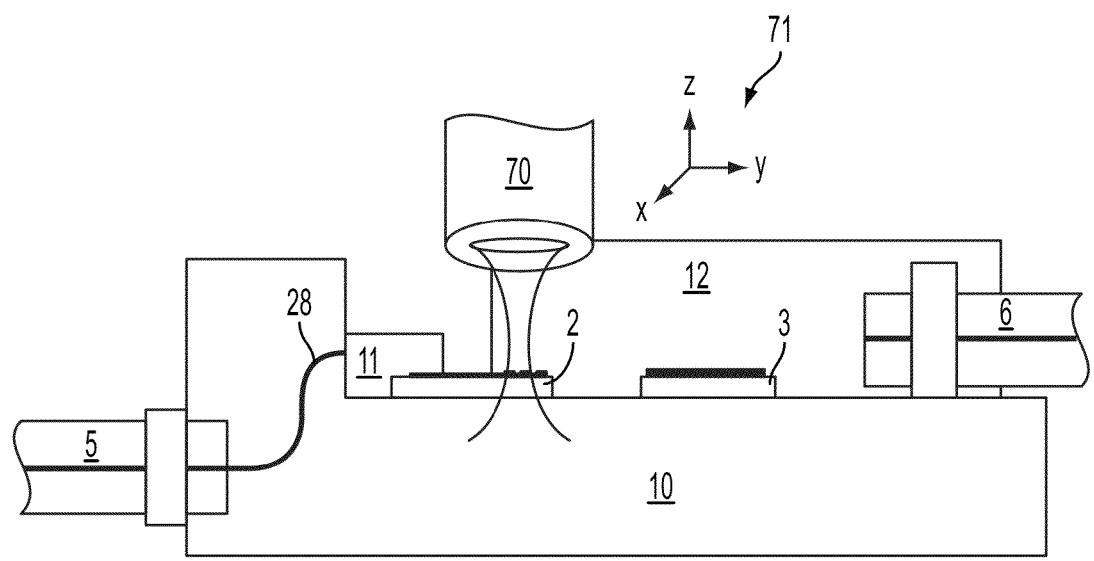
Figure 16:
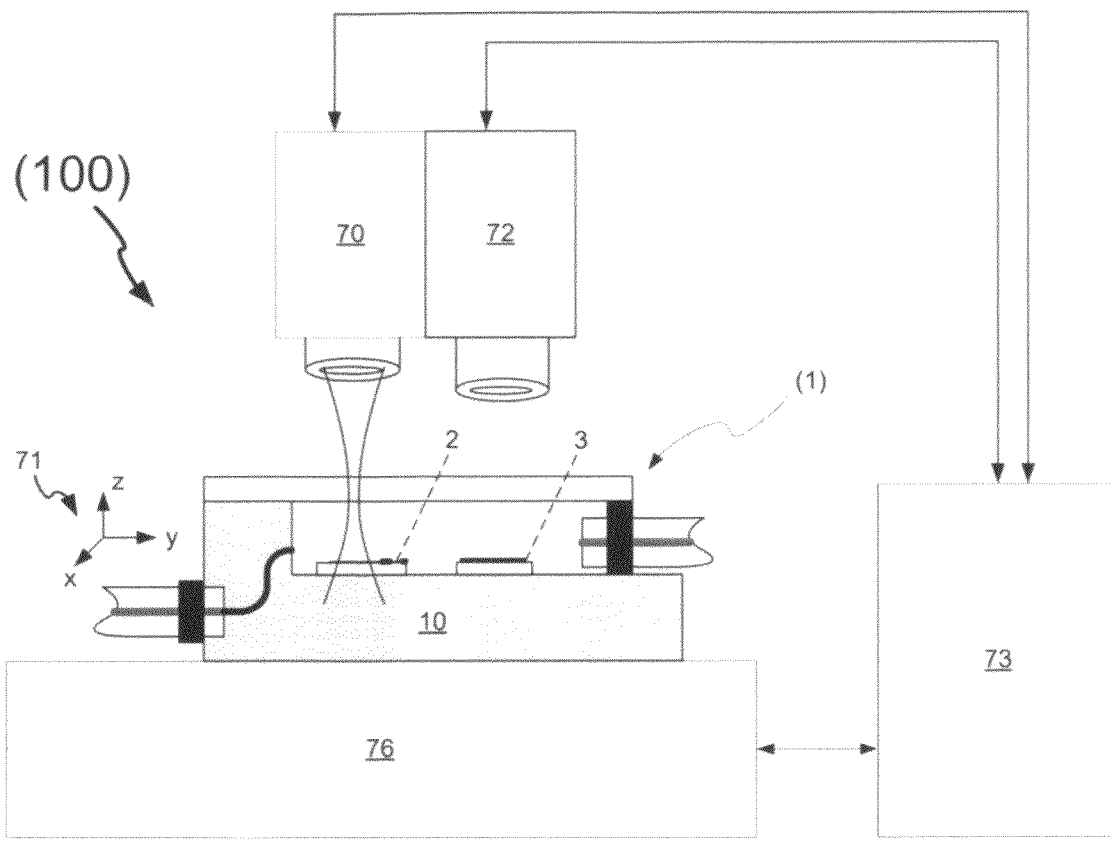
FIG. 16 is a schematic showing an embodiment of a device for producing photonic wire bonds according to the invention.

As described in more detail below in connection with FIGS. 12 and 16, a measuring system (70) is used to detect the spatial position and orientation of the optical elements (2-6) mounted on the component carrier (10) and/or of the associated connecting locations (15-18). This measuring system can be based, for example, on an interferometry method for the highly precise axial position measuring or a camera-based method for the lateral position detection and the identification of the connecting points. In addition, laser scanning methods can be used which scan the interface between the elements to be connected and the surrounding resist material and which, in the process, detect the position of the surface as well as the precise spatial position of the individual connecting points. Confocal microscopic techniques, for example, also offer themselves as further options for providing a high-resolution, three-dimensional dataset for the optical interfaces of the arrangement from which the position of the elements to be connected and the connecting locations can be extracted. In place of a direct detection of differently designed connecting locations or points, alignment marks (40) with defined relative position to the connecting location can also be provided on the optical elements to be connected, wherein the position of these markers can be detected by the measuring system and can be used for the spatial positioning of the connection waveguides to be generated; see also FIGS. 3 and 4. The measuring system used for detecting the position of the optical elements to be connected must have sufficiently high accuracy and resolution to ensure a reproducible positioning of the connecting waveguide (20), relative to the connecting structures (55-58). On the other hand, a sufficiently large measuring range is required so that both end points of the waveguide trajectory can be measured within one and the same coordinate system. The absolute precision of the measuring system should preferably be better than 1 μm, especially preferred 500 nm and in particular 50 nm. The spatial resolution should advantageously be better than 1 μm, especially better than 500 nm and particularly preferred better than 200 nm. The measuring range that can be detected with one and the same coordinate system in this case preferably extends over more than 100 μm, preferably more than 500 μm, and especially preferred more than 2 mm.

Figure 5:
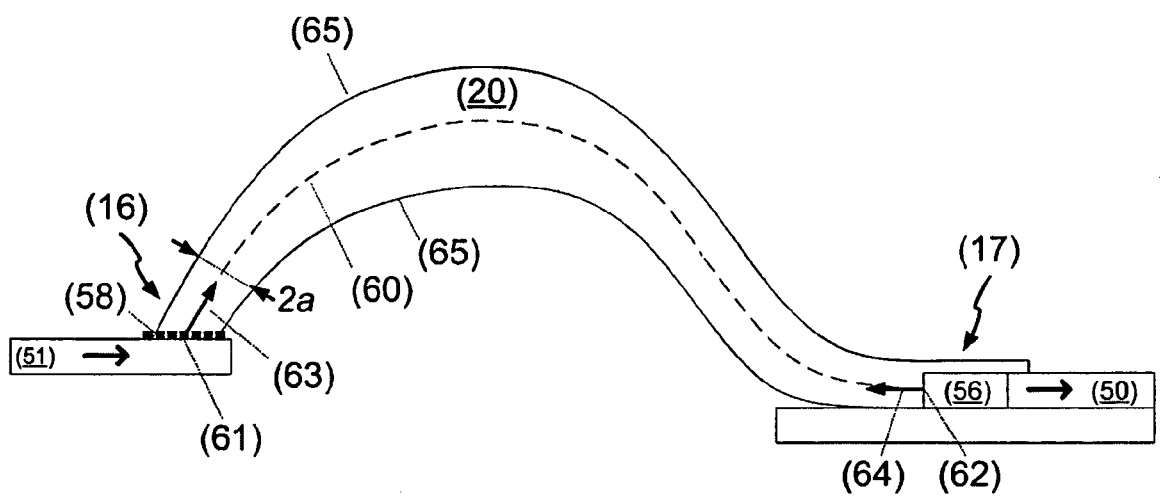
FIG. 5 is a schematic view showing the trajectory of an optical waveguide structure (photonic wire bond) between light exit locations of optical connecting structures.
Figure 6:
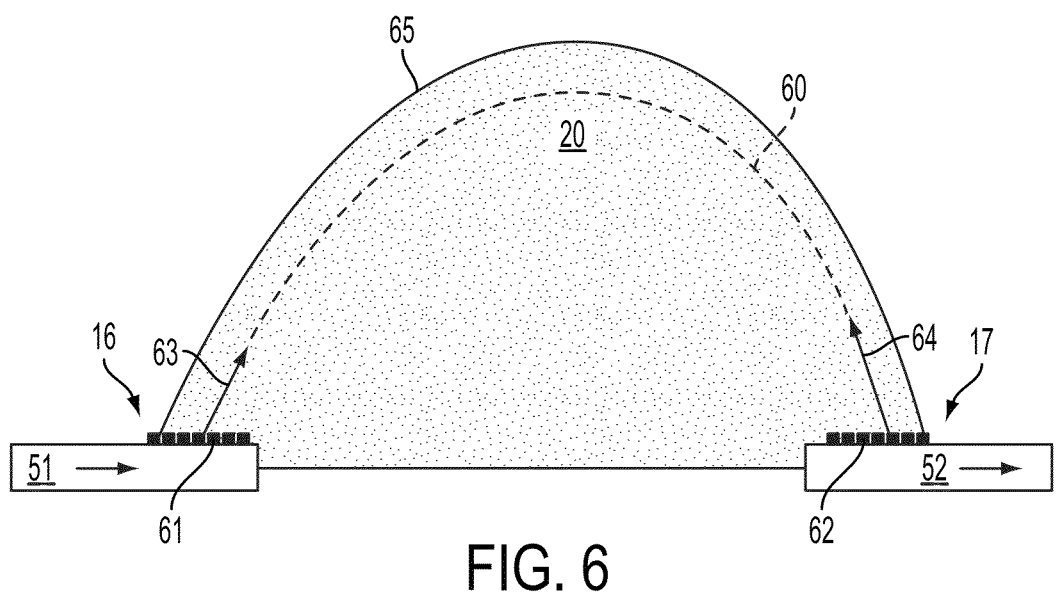
FIG. 6 is a schematic showing another trajectory of a photonic wire bond between light exit locations of connecting structures.

Referring to FIGS. 5 and 6, the shape of a connecting waveguide (20) is adapted to the spatial position of the regions (16, 17) to be connected and the propagation directions for the light at these locations. The local propagation direction for the light at the connecting locations (15-18) is described by the directional vectors (63, 64) and depends on the design of the connecting structures (55-58), wherein the light exit locations are marked by the points (61), (62). The geometry of the photonic wire bond (20) is then primarily determined by the course of the waveguide trajectory (60) between the points (61) and (62). The trajectory (60) is preferably selected such that it assumes the direction predetermined by the direction vectors (63, 64) at the end points while the integral optical losses, occurring along the photonic wire bond (20), are minimal.

On the one hand, these propagation losses are caused by the intrinsic loss mechanisms of the waveguide (e.g. losses through material absorption, scattering losses on rough surfaces), wherein this share increases with the length of the waveguide trajectory (60). Added to this are the radiation losses which are caused by the curvature of the trajectory and, accordingly, depend on the refractive index contrast of the connecting waveguide.

The intrinsic losses are characterized by a loss coefficient a which depends on the material and waveguide cross section. The integral amount occurring along the waveguide trajectory can be minimized by selecting the shortest possible waveguide trajectory. In contrast, the radiation losses of the waveguide strongly increase with the increase in the curvature K. To minimize the integral radiation losses, small curvature radii should be avoided which, as a rule, leads to long waveguide trajectories, so that conflicting goals exist for minimizing the intrinsic losses and the radiation losses. This conflict can be solved optimally with a specific waveguide trajectory. The course of this trajectory (60) can be determined through minimizing a loss function I, for example having the following form:

$$I(\vec{r}(s)) = \int_0^L (\alpha + f(K(s))) ds \quad (1)$$

with $P_{out} = P_{in} \cdot e^{-I}$, where $P_{out}$ is the optical output-power, whereas $P_{in}$ is the optical input-power. In this case, $\vec{r}(s)$ represents the course of the curve in space as parameterized according to the curve length s; K(s) represents the curvature of the trajectory; and $f$ represents a monotonously growing function describing the dependence of the radiation losses on the local curvature. The minimizing of the function based on the equation (1), with the marginal conditions predetermined by the end points (61, 62) and the direction vectors (63, 64), as a rule is made numerical and supplies the optimal course for the waveguide trajectory (60), in view of the integral optical losses.

Additional criteria can be used when designing the trajectory, e.g. avoiding collisions with other structures, the mechanical stability of the freestanding waveguide structure or the writing time that is required for producing the photonic wire bond (20) with a specific direct-writing lithographic method. These criteria are reflected in the additional marginal conditions used for minimizing the loss function according to equation (1). Tapered structures in the region of transition to the connecting points must be considered when determining the ideal trajectory.

In addition to the trajectory (60) of the connecting waveguide, the course of the cross-sectional geometry along this trajectory also plays an important role because it determines the shape of the core-sheath interface for the optical waveguide (65). The cross sectional geometry, for example, can assume round, elliptical or polygonal forms. For many applications it is advantageous if the photonic wire bond (20) has two linear main polarization states with the largest possible optical band width, wherein non-rotation symmetrical, for example elliptical or rectangular, cross sectional profiles can be used for this. In photonic systems using polarization multiplexing methods, the course of the cross-sectional geometry is preferably selected such that the photonic wire bond (20) has two linear polarized main polarization states which are transitioned via corresponding connecting structures (23, 24, 55, 56, 57, 58, 59) to the two main linear polarization states of the connected, integrated optical system.

In addition to standard waveguide structures, for which wave guidance is achieved with a refractive index contrast between core and sheath region, waveguide structures can also be used that guide the light along a convex dielectric interface in the form of so-called whispering gallery modes. A structure of this type is sketched, for example, in FIG. 6, wherein the trajectory (60) that is relevant for the light guidance moves along the convex surface (65), at a distance determined by the local curvature of the surface.

A high-resolution, direct-writing lithographic method is used for the three-dimensional structuring of the photonic wire bonds (20, 21, 22), which can be based on the interaction between electromagnetic radiation and the resist material (11, 12) that results in a thermally or photo-chemically induced change in the material.

With reference to FIGS. 1 and 11-15, resist materials (11, 12) can be designed such that as a result of the structuring with the direct-writing lithographic method, the refractive index is increased and an optical waveguide is thus generated which is embedded into non-exposed resist material with a lower refractive index. Following the exposure, the resist structure is normally fixated by removing, for example, the photo-sensitive component from the material. In this way, embedded waveguide structures are obtained which are distinguished by easy production and high mechanical stability. However, it is difficult to achieve index contrasts of more than 0.01 with the material systems available today.

According to one embodiment, the non-exposed regions of the resist materials (11, 12) are removed during a development step following the exposure. The remaining structures can either be used directly as freestanding waveguides with high index contrast against the ambient air, or they can be embedded in a further step into a cladding material (25) with low, essentially freely selectable refractive index.

Light in the ultraviolet, visible, infrared wavelength or X-ray range, can be used for the lithographic definition of the waveguide structures (20, 21, 22). A specific intensity distribution of the electromagnetic radiation in the volume for the resist material must be generated to produce defined structures. Three-dimensional structures with extremely precisely defined geometries can be achieved with multi-photon processes for which the degree of material modification depends non-linearly on the local intensity of the light, wherein these methods include, for example, the two-photon polymerization. For the most part, pulsed radiation sources are used for which the maximum optical output is higher by several orders of magnitude than the average output in order to reach the optical intensities necessary for the multi-photon processes.

Three-dimensional structures can be generated, for example with a laser beam (30), for which the focus (31) (see FIG. 1) has the required intensity for changing the material. The resist material can thus be modified at precisely defined locations in the volume. As a result of the controlled movement of the focal point within the resist volume, many such point-shaped structural elements ("voxels") can be linked together and complex three-dimensional structures can be built. In the process, different writing strategies can be used which depend on the kinematics used and the properties of the resist material. With resist materials which are viscous or liquid during the writing operation, a movement ("swimming away") of already exposed structural regions within the resist volume must be prevented. Writing strategies therefore offer themselves for which the connecting optical waveguide is configured starting from the connecting locations (16, 17), without isolated or only weakly anchored partial regions being generated during the writing.

Figure 7A:
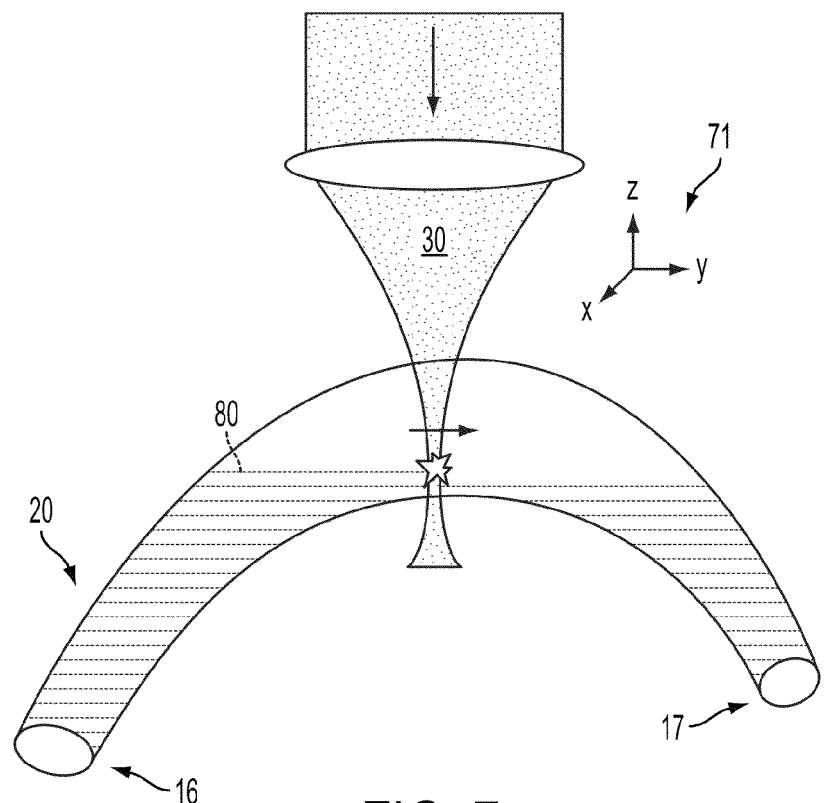
FIGS. 7a, 7b, 8a, 8b, and 9 are schematics showing different embodiments for optical waveguide structuring methods that could be used to implement the invention.
Figure 7B:
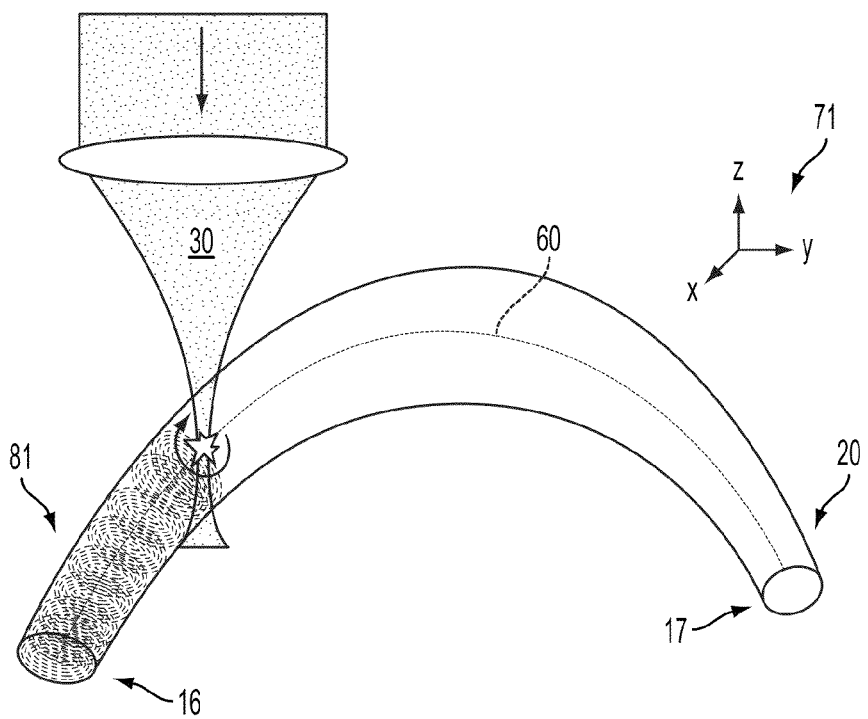
Figure 8A:
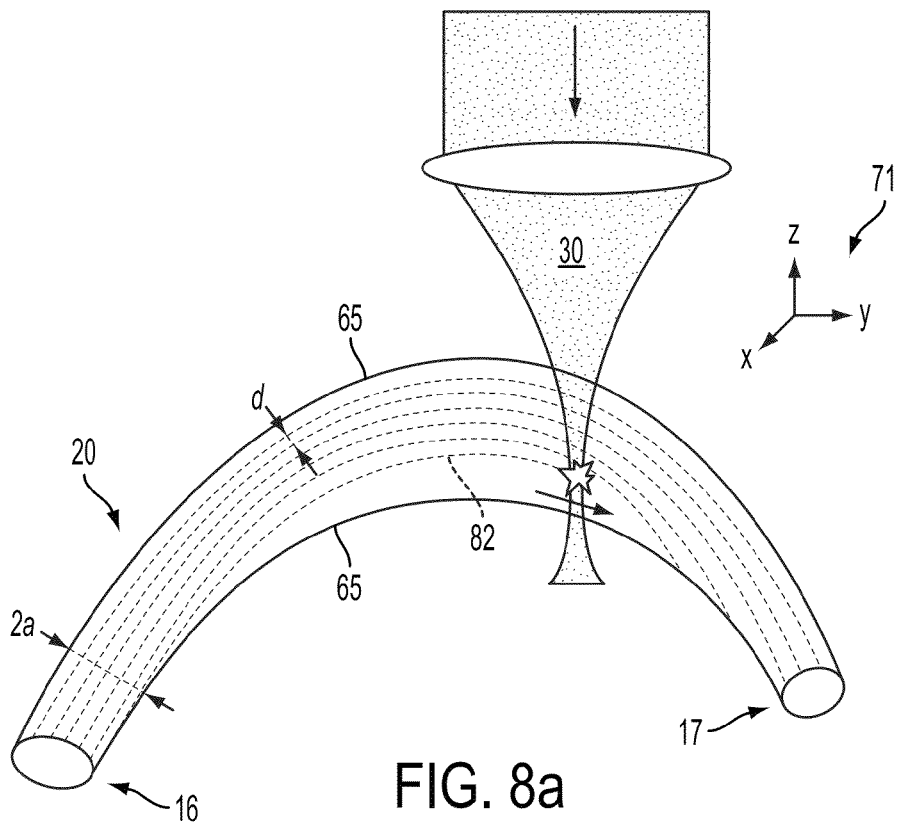
Figure 8B:
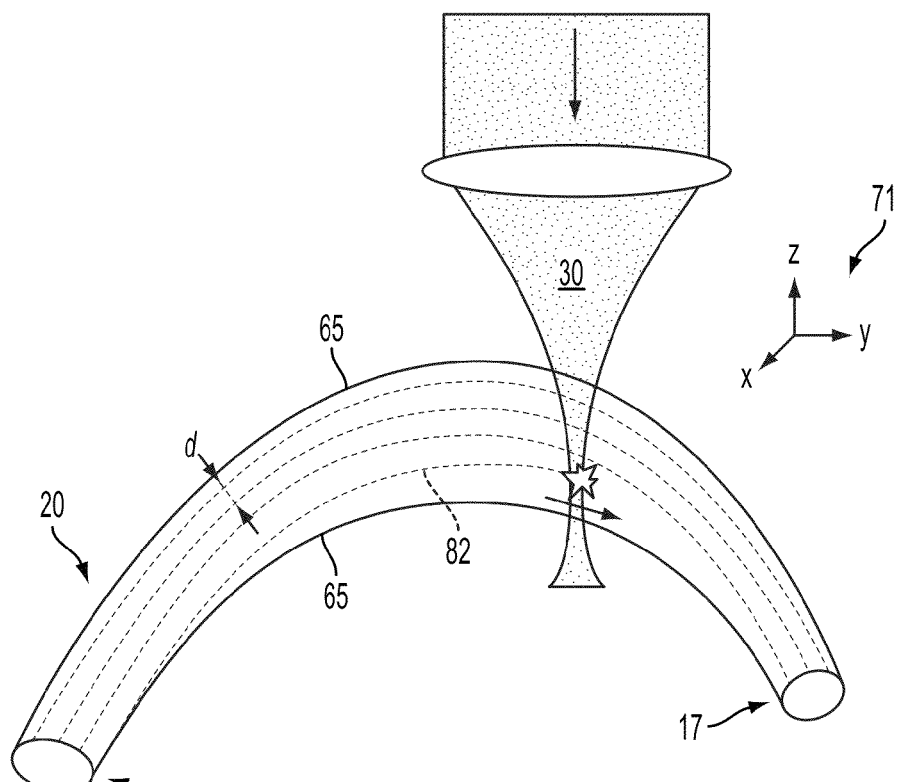

Different exemplary writing strategies are illustrated in FIGS. 7(a), 7(b) and 8(a), 8(b). A very simple writing strategy is based, for example, on the division of the three-dimensional waveguide structure into separate, mostly parallel layers (80) which are combined in layers along a specific direction as shown in FIG. 7(a). Each of these layers in turn consists of straight, mostly parallel lines, each of which is configured with individual, point-type structural elements (voxels). Alternatively, the three-dimensional waveguide structure can also be configured with individual disks (81) which are oriented perpendicular to the center line (60) of the waveguide as shown in FIG. 7(b). The disks can be split up, for example, into straight or into concentric elliptical lines. Alternative thereto, they can also be written in the form of continuous spirals. With the methods schematically shown in FIGS. 7(a), 7(b) and 8(a), 8(b), the waveguide is configured starting with the connecting locations (16) and (17) and is thus at all points in time fixedly connected to the substrates (2, 3, 4) and/or the input and output waveguides (5, 6). Writing strategies of this type can also be used with viscous or liquid resist materials. However, the strong curvatures of the writing trajectories are a disadvantage of these methods. The curvature radii are primarily determined by the radius of the waveguide structure and can assume values of less than 1 μm. Since the maximum lateral acceleration when moving along a trajectory is limited in the upward direction by the kinematics of the lithography system, strongly bent curves can be written only at very low speed. In view of the writing time, writing strategies are therefore advantageous for which the waveguide structures are composed of individual, if possible only slightly curved trajectories, wherein this can be achieved if the writing trajectories extend in a longitudinal direction of the waveguide as shown in FIGS. 8(a) and 8(b). The three-dimensional waveguide structure can thus be configured with individual and uniformly spaced-apart lines, for example extending parallel in a longitudinal direction as shown in FIG. 8(a). These lines start and end either at the connecting regions (16) and (17) or at the core/sheath interface (65) of the waveguide. Alternatively, the waveguide can also be configured with individual lines for which the lateral distances d along the waveguide are adapted to a differing cross section as shown in FIG. 8(b). With this method, all writing trajectories start and end at the connecting regions (16) and (17). As a result, a very smooth waveguide surface (65) can be achieved which minimizes the propagation losses caused by optical scattering. With the method sketched in FIG. 8(b), the exposure dose along the writing trajectories can be dynamically adapted to the local spacing for the exposure trajectories to ensure a complete exposure of the material for long distances, without risking an excessive exposure for short distances. In addition to the methods outlined in FIGS. 7(*a*), 7(*b*) and 8(*a*), 8(*b*), other writing strategies can also be used, for example based on a combination of the above described methods. With waveguide cross sections that vary strongly in the longitudinal direction, for example, the internal regions can be configured with parallel lines and non-continuous line sections as shown in FIG. 8(*a*) while regions, which are close to the surface (65), are configured with continuous lines arranged at varying distances. Writing strategies can also be realized for which only an outer sheath of the waveguide to be produced is written on. The non-exposed material surrounded by the sheath can also be polymerized and thus solidified in a subsequent step using flood light. This method has the decisive advantage of resulting in a time saving since the writing of the lines close to the axis can be omitted. The challenge with this writing strategy is in the production of a dense sheath surface.

Alternative to configuring complex three-dimensional structures with individual, identical structural elements (voxels), the three-dimensional structuring can also be realized with a laser beam where the form of the field distribution in the focal region is adjusted dynamically with the aid of an adaptive optical unit. It is thus possible to continuously adapt the shape of the structural element generated with the laser beam during the writing operation. With this method it is possible, for example, to produce a complete photonic wire bond during a single operational step as follows: The region of interaction is moved along the waveguide trajectory (60) through the resist material (11, 12); the cross-sectional geometry of the waveguide can be adjusted at any point through the dynamically adapted voxel form. The resolution for this method is no longer determined solely by the voxel size, but depends in a complex manner on the adaptive optical system that is used. To permit a reliable connection of the photonic wire bond to single-mode waveguides, however, such a method must also allow producing structures with lateral dimensions of preferably less than 4 μm, especially less than 2 μm and especially preferred of less than 1 μm.

Figure 9:
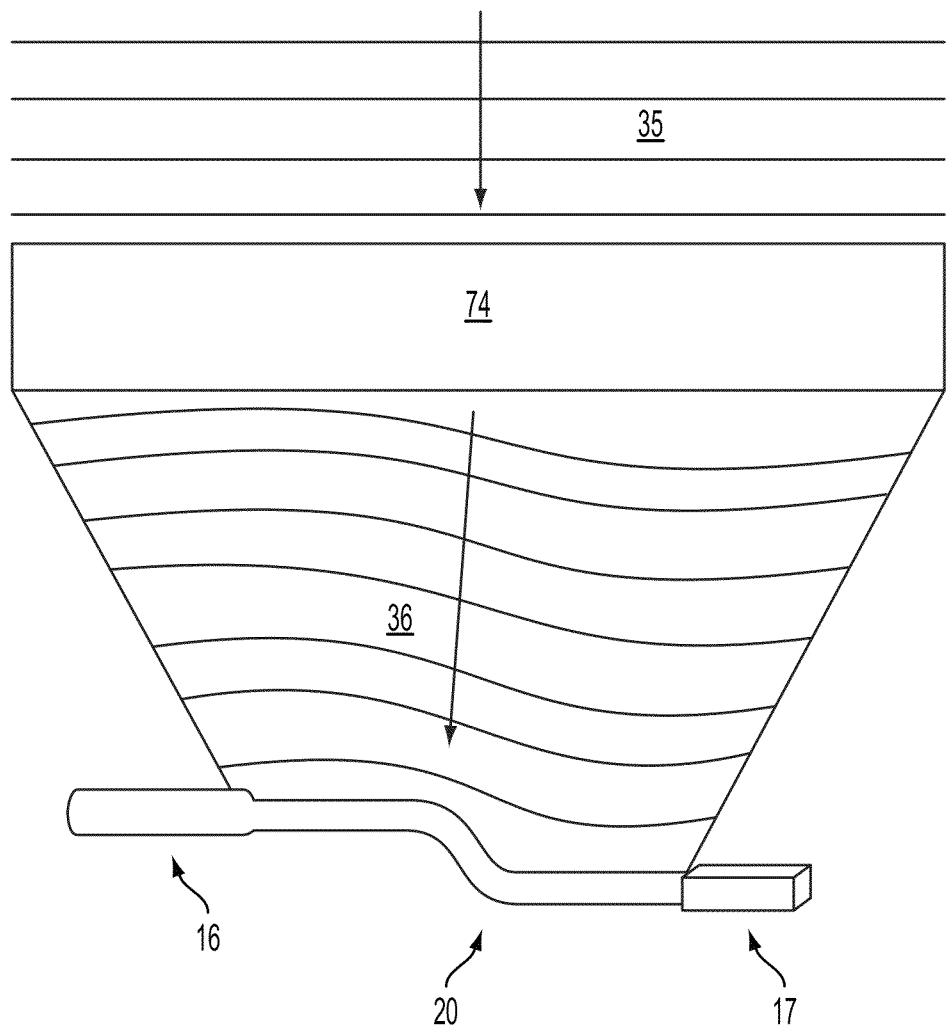

Alternatively to the above-described "scanned" structuring operations, the interferometry (or holographic lithography) techniques can also be used, which generate three-dimensional interference patterns with the aid of targeted superimposition of coherent light waves. These patterns define the form of the waveguide (20) in some sections or completely in the volume of the resist material (11). A method of this type is schematically illustrated in FIG. 9. An amplitude-phase modulation unit (74) converts the three-dimensional structure information of the waveguide to the amplitude and phase course of a coherent light field. FIG. 9 shows a coherent input field (35), for example a planar light wave and an illumination field (36) which comprises the three-dimensional structure information for the waveguide. In FIG. 9, the illumination field (36) comprises a delimited spatial angle. However, with suitable optical arrangements, a much larger spatial angle region can also be used for the lithography, for example by introducing an additional light path which permits a coherent illumination of the sample from above and below. For methods of this type, techniques from the field of high-resolution microscopy such as the so-called 4π microscopy can be used.

The direct writing lithographic method must have sufficient accuracy and spatial resolution to allow photonic wire bonds to be connected to lateral single-mode waveguide structures. This accuracy with which individual structural elements can be placed in space is preferably better than 1 μm, especially better than 200 nm and particularly preferred better than 50 nm. Independent of the lithographic method, the resolution is preferably higher than 2 μm, especially higher than 1 μm and particularly preferred higher than 200 nm. When using scanning 3D lithographic methods operating with a beam, the generated structural elements (voxel) frequently are not point-shaped, but have a nearly ellipsoidal shape. In that case, the spatial anisotropic resolution of the lithographic method can already be taken into consideration during the design of the waveguide structure. The aforementioned accuracies and resolutions are maintained over a range which preferably extends over more than 100 μm, especially more than 500 μm and particularly preferred more than 2 mm.

Individual aspects of the method for the optical connection of planar integrated lateral, single-mode waveguides are discussed above. The method steps are shown with examples in FIGS. 10-15 and are disclosed once more in the following, wherein the representation below must be viewed as exemplary.

Figure 10:
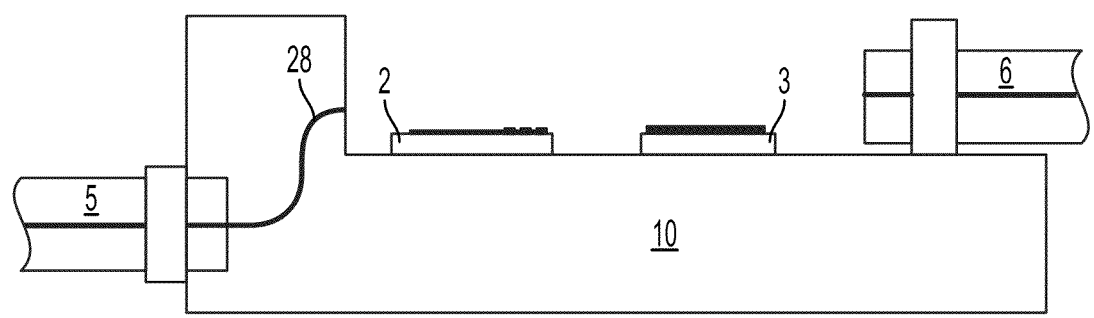
FIGS. 10 to 15 show an example of method steps that could be used to structure optical waveguides to connect lateral single mode planar waveguides according to the invention.
Figure 11:
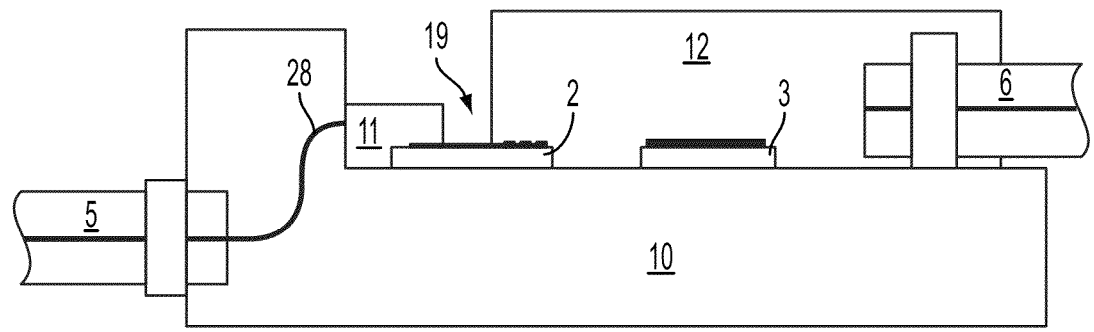
Figure 13:
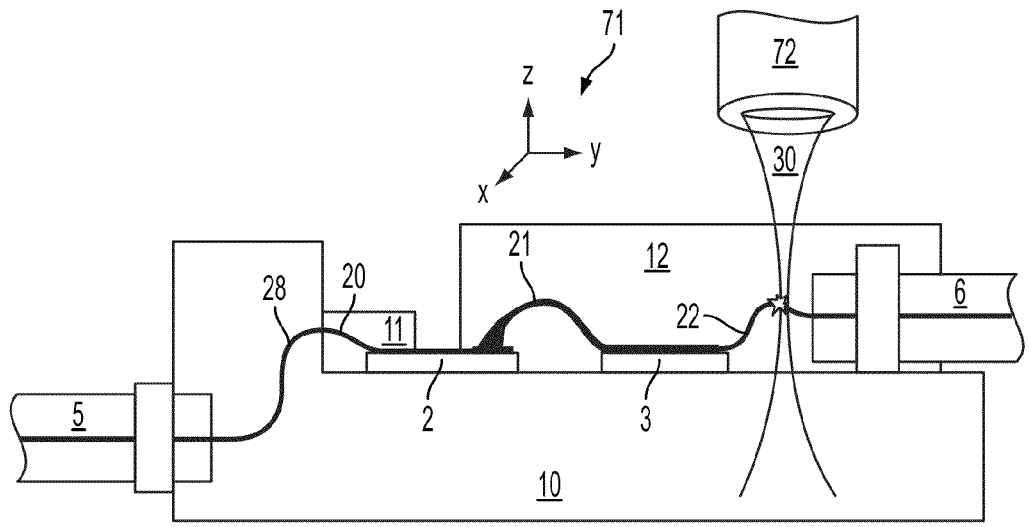

The method for producing photonic wire bonds comprises the following steps:

1. In a first step, the photonic chips (2-4) to be connected and possibly existing input and output waveguides (5, 6) are mounted on a joint component carrier (10) as shown in FIG. 10. No special precision requirements must be met since the precise position of the elements to be connected is detected during the course of realizing the method and the geometry of the connecting waveguides is adapted thereto. The component carrier itself can also contain waveguides (28) which form a transition between the input and output waveguides and the photonic components to be connected.
2. In a second step, the regions of the elements to be connected are covered with a resist material (11, 12) as shown in FIG. 11. For the subsequent contacting of photonic components with standard metal-wire bonds, non-covered regions (19) can also be provided. The second step also involves possible pre-treatments of the resist materials, for example a pre-curing under the effect of heat.
3. In a third step, the spatial position and orientation of the optical waveguides (50, 51, 52, 53, 54) to be connected and/or the input and output waveguides (5, 6) are detected with a measuring system (70), relative to a machine coordinate system (71) as shown in FIG. 12.
4. In a fourth step, a favorable geometry is determined for each of the photonic wire bonds (20, 21, 22) on the basis of the data determined during the third step. The trajectory of the waveguide is selected such that the photonic wire bond connects the respective connecting locations and that the waveguide is oriented at the starting and end points in the direction predetermined by the connecting structure and does not overlap with other structures. In addition to the trajectory of the waveguide, a favorable course of the waveguide cross section along the trajectory is determined. The precise form of the trajectory as well, as the course of the waveguide cross section can be determined with the aid of various optimization criteria which include, for example, the optical losses of the connecting waveguide or the writing time required for producing the waveguide with a direct-writing lithographic method. According to one writing strategy, the three-dimensional form of the waveguide is converted to a machine-readable dataset.
5. In a fifth step, the connecting waveguides (20, 21, 22) are defined with the aid of a direct-writing lithography device (72) as shown in FIG. 13. The achievable resolution in this case is approximately 2 μm or less. The lithography system uses the machine coordinate system (71), used for the position measuring in step 3, and/or a sample coordinate system derived therefrom. When combining an optical measuring method with an optical lithography method, parts of the optical arrangement can be used for the position determination as well as for structuring the waveguide, thereby making it possible to minimize the influence of errors in the optical system.

Figure 14:
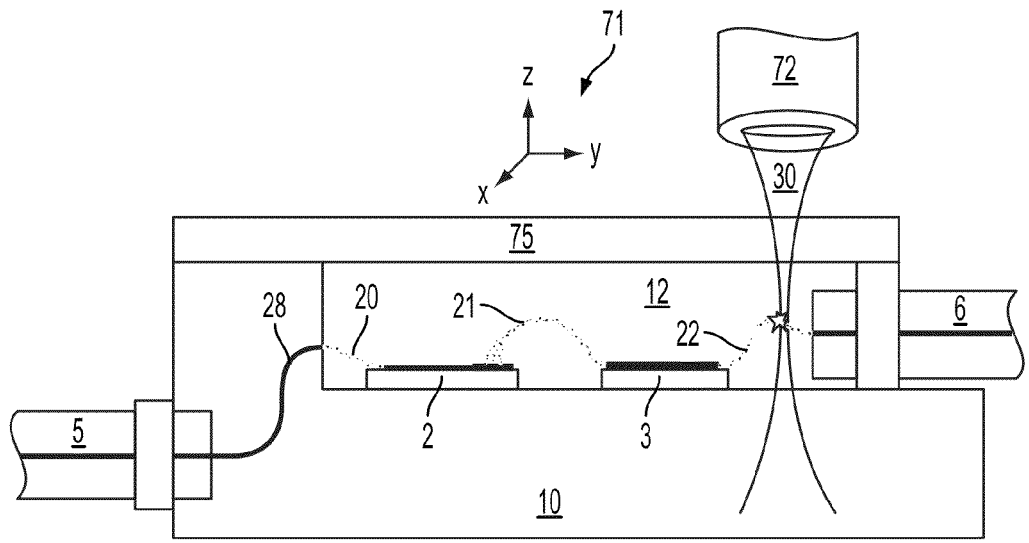

With the example shown in FIG. 13, the optical structuring of the connecting waveguides in the volume of the resist materials (11, 12) occurs with a focused laser beam that is radiated onto the surface of the resist materials and which modifies the material at its focal point. In practical operations, it is frequently difficult to realize resist layers (11, 12) with sufficient thicknesses which simultaneously also have a surface with optical quality (flatness). This problem can be circumvented with the arrangement shown in FIG. 14. The optical structuring occurs with the aid of a transparent element (75) which has a defined interface with optical quality to the material (12). The optical element can be placed onto the component carrier 10, as illustrated in FIG. 14, in the form of a "cover glass" or it can form a component of the component carrier 10 ("transparent writing window"). Alternatively, the surface of the resist layer can be determined in step 3 and can be considered during the lithographic conversion of the waveguide structure.

6. In a sixth step, the structured resist materials (11, 12) are subjected to a post-treatment, wherein this step comprises, for example, one or several of the following processes:

fixation of the exposed resist structure, e.g. with the aid of a thermal treatment;

removal of the non-exposed regions of the resist material during a development step.

7. In an optional seventh step, the produced waveguide structures are post-treated, which can improve the optical light guidance or the physical or chemical stability of the waveguide structures. This step involves, for example, one or several of the following processes:

depositing a coating (14) onto the surface of produced waveguide structures, for example by precipitating out a coating material from a gas phase (chemical vapor deposition or CVD; atomic layer deposition ALD) or from a liquid phase;

embedding of freestanding structures in a cladding material with low refractive index.

Figure 15:
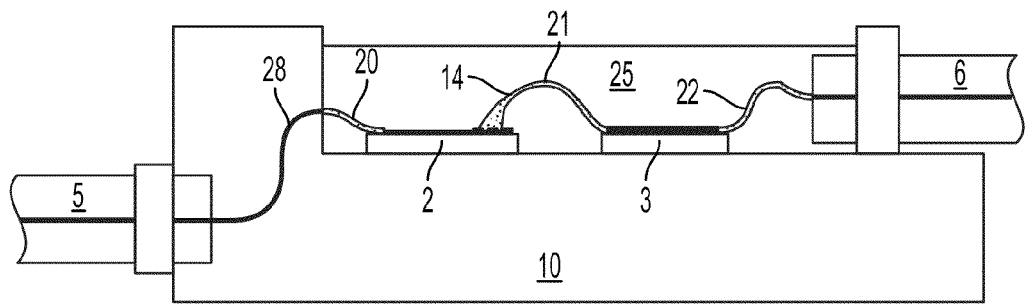

The example in FIG. 15 illustrates a structure for which the non-exposed regions of the resist material (11, 12) were removed during the step 6. The freestanding connecting waveguides are initially provided with a protective layer (14) and are then embedded into a low-refractive cladding material (25).

Connecting photonic wire bonds (20, 21, 22) to planar integrated, lateral single-mode waveguides requires a precise relative positioning between the substrates (2, 3, 4) and/or the associated optical connecting locations (16, 17, 18) and the lithographically produced waveguide structures (20, 21, 22). The accuracy over the total operating range for the relative positioning is preferably better than preferably better than 200 nm and especially preferred better than 50 nm.

A close linking of the measuring system and the lithographic system is necessary to meet these accuracy requirements. FIG. 16 schematically illustrates an example of a corresponding device for producing photonic wire bonds which comprises a holding device (76) for the optical arrangement (1) mounted on the component carrier (10), a measuring system (70) for determining the spatial position and orientation of the elements to be connected and their connecting locations, relative to a machine coordinate system (71), a direct-writing lithography system (72) which allows the three-dimensional structuring of connecting waveguides having a resolution better than 2 µm, and a data processing unit (73). The holding device (76) may comprise kinematics or mechanisms which permit a precise spatial positioning of the optical arrangement (1), relative to the measuring system (70) or to the lithography system (72). Alternatively, the measuring system (70) and the lithography system (72) can also be provided with internal positioning devices (e.g. scanning mirrors) which can be used to move the measuring or writing beam relative to the optical arrangement.

A data processing unit (73) controls the sequence of the above-described production method steps. The data processing unit (73) furthermore computes a favorable three-dimensional geometry for the connecting waveguides, based on the measuring data provided by the measuring system (70), and converts this geometry with the aid of a suitable writing strategy to a dataset which is then used by the lithography system as basis for structuring the waveguide.

The realization according to the invention of the herein described photonic wire bonds can be based, for example, on the structuring of a photoresist from the Su8 family (company Microchem Corp.) with two-photon polymerization. A mode-coupled laser may be used in this case as a light source for the lithography, wherein this laser emits optical pulses with a pulse width of 120 fs and a repetition rate of approximately 100 MHz at a wavelength of 780 nm. The pulsed laser beam is focused with an objective having a high-numerical aperture (100×, NA=1.4) onto the resist material Su8. Owing to the high peak intensity of the pulsed laser beam, a two-photon polymerization takes place in an ellipsoidal region at the focal point. By moving the sample (optical arrangement (1)) in a lateral direction, relative to the focal point, individual ellipsoidal points can be combined to form complex three-dimensional structures. The positioning of the writing beam relative to the sample is achieved, for example, through piezo positioning tables which can have traversing ranges of several hundred micrometers and repeatability of less than 10 nm. The lateral resolution of the lithography system perpendicular to the writing beam is provided by the beam diameter in the focus and ranges from 150 nm to 500 nm, depending on the selected dose. In the axial direction, the resolution is between 600 nm and 1500 nm. The laser output must be adapted to the writing speed in that case. For a linear relative movement with approximately 200 µm/s for the sample perpendicular to the axis of the writing beam, writing capacities ranging from 10 mW and 20 mW are typically used.

The waveguides to be connected are integrated silicon-on-insulator (SOI) waveguides having a rectangular cross section of 220 nm in height and approximately 400 nm in width. Inverse tapers are used for the connecting structures, wherein the width of these tapers is reduced to approximately 60 nm over a distance of, for example, 30 µm. A confocal measuring method is used to determine the position of the connecting structures. The same optics and mechanics which are also used for the illumination are essentially used for the measuring operation. Possible image errors in the optical equipment and/or position errors in the mechanical equipment will therefore self-compensate, at least in part. Using a microscope objective with the aforementioned numerical aperture, lateral regions of typically up to 100 µm can be detected in the broad field without having to move the sample. Typical resolution values are approximately 150 nm in the lateral and <100 nm in the axial direction. The repeatability of the position determination for broad structures can be better than 10 nm.

The waveguide trajectory is determined by numerically minimizing the loss function according to the equation (1). The connecting waveguides are structured in the longitudinal direction, meaning by producing individual parallel lines that extend in the longitudinal direction. The connecting waveguides have an elliptical cross section with a large semi-axis of approximately 2 μm and a small semi-axis of approximately 3 μm. Following the exposure, the resist material is developed. The waveguide structures that are exposed in the process are then embedded in a low-refractive cladding material (e.g. a fluorinated polymer which is commercially available under the brand name CYTOP). At 1550 nm, Su8 has a refractive index of approximately 1.57 while the refractive index of the cladding material can be at 1.4. With the aforementioned elliptical cross section, an efficient light guidance is possible only for two basic modes that are polarized orthogonal to each other, wherein the ellipticity causes an uncoupling of these modes. Higher waveguide modes are guided only weakly and therefore do not play a role worth mentioning for the light propagation. The waveguide is therefore effectively single-mode and permits an efficient connection to planar integrated, lateral single-mode nano waveguides.

Figure 17:
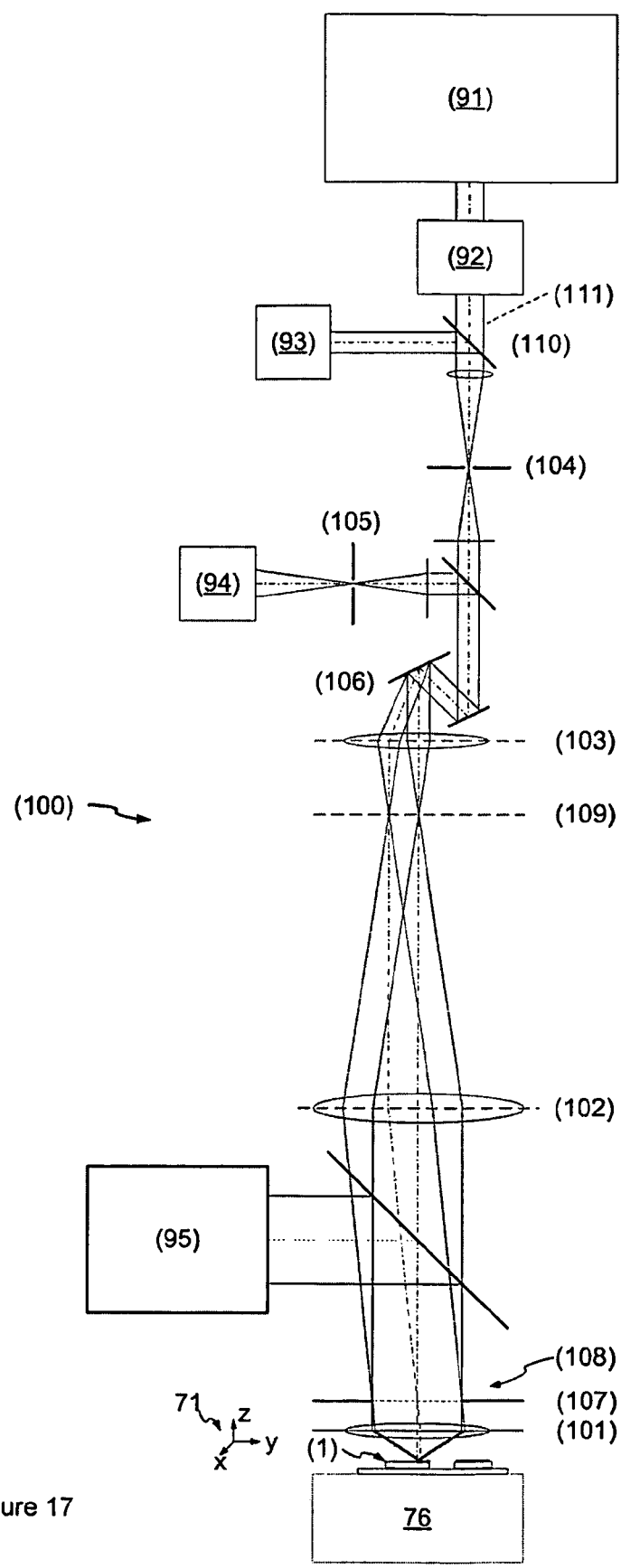
FIG. 17 is a schematic showing another embodiment of a device for producing photonic wire bonds according to the invention.

FIG. 17 illustrates an example of a device for producing photonic wire bonds. The positioning unit (76) here functions to spatially position the optical arrangement (1), consisting of component carrier (10) and thereon mounted substrates (2-4), within a machine coordinate system (71) that is jointly used by the measuring and the lithography system. To avoid distortions during the detection, measuring and lithographic structuring of the arrangement (1), a telecentric beam path (108) on the object side of an objective lens 101 is used for which an aperture (107) is located in the focal plane of the objective lens (101), on the image-side. A camera (95) is used for detecting the optical arrangement (1) in the broad field. With the aid of a suitable calibration, positions in the camera image can be made to relate to coordinates in the machine coordinate system (71). A highly precise, completely three-dimensional detection of the position of the optical waveguide (50, 51, 52, 53, 54) to be connected and/or the input and output waveguides (5, 6), however, is possible only with the aid of a confocal measuring method. For this, the light from a light source (93) is focused with a circular aperture (104) and is subsequently guided with the aid of one or several scanning mirrors (106), a scanning lens (103) and a tube lens (102) to the objective (101) which focuses the light. The light scattered back at the focal point is focused into a circular aperture (105) by a detection beam path, arranged confocal to the illumination beam path, and is detected by a detector (94). With the aid of a lateral scanning of the illumination and detection beam path, the total focal plane on the objective side of the objective (101) can thus be scanned. By displacing the optical arrangement (1) in the z direction, a three-dimensional dataset can thus be detected which permits a precise spatial position detection of the optical elements to be connected. The same optical arrangement is also used for the lithographic structuring of the single-mode connection waveguide (20-22) with two-photon polymerization. For this, a pulsed laser beam (111) is coupled via a beam divider (110) and with the aid of the circular aperture (104) into the illumination beam path which is then focused by the objective (101) onto the volume of the resist material (11, 12). A structuring of complex, three-dimensional geometries is achieved, for example, in that the lithography beam is moved by the scanning mirror (106) in the lateral direction while the photonic system (1) is displaced by the positioning unit in the axial direction. The pulsed laser beam is generated with a light source (91) and is amplitude-modulated with a modulation unit (92). The complete arrangement is controlled with a data processing unit (73) which is not shown in FIG. 17) to provide a better overview.

Two-photon polymerization allows for arbitrary three-dimensional waveguide geometries. By specific 3D waveguide routing algorithms, complex cross-routing of the signals is possible. In particular, photonic wire bonding enables low-loss on-chip waveguide crossings that are hard to realize in conventional planar waveguide technology.

Limitations in waveguide geometry might be imposed by the mechanical stability of freestanding photonic wire bonds, but structures investigated so far turned out to be very sturdy with waveguides of 2 μm diameter spanning distances of more than 100 μm.

Figure 18A:
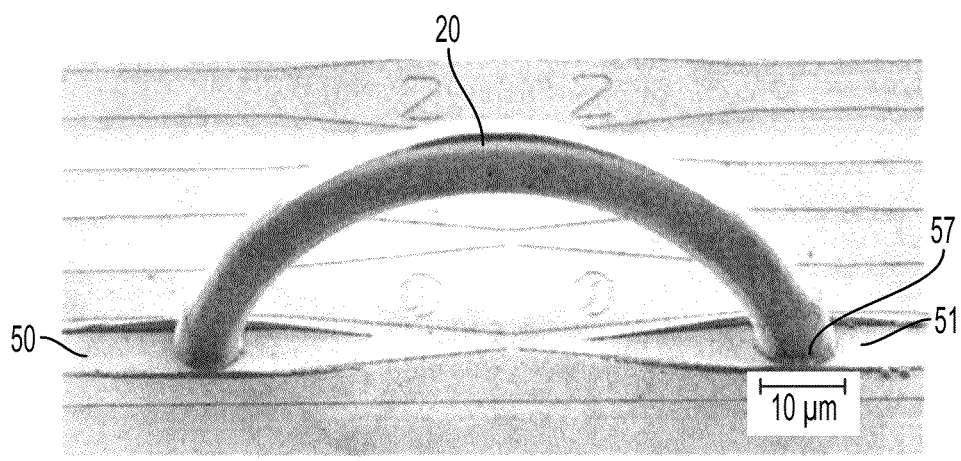
FIG. 18(a) is an electron microscope recording of an optical connecting waveguide and FIG. 18(b) is a light-microscopic recording of several photonic wire bonds, realized on a joint chip as shown in FIG. 18(a).
Figure 18B:
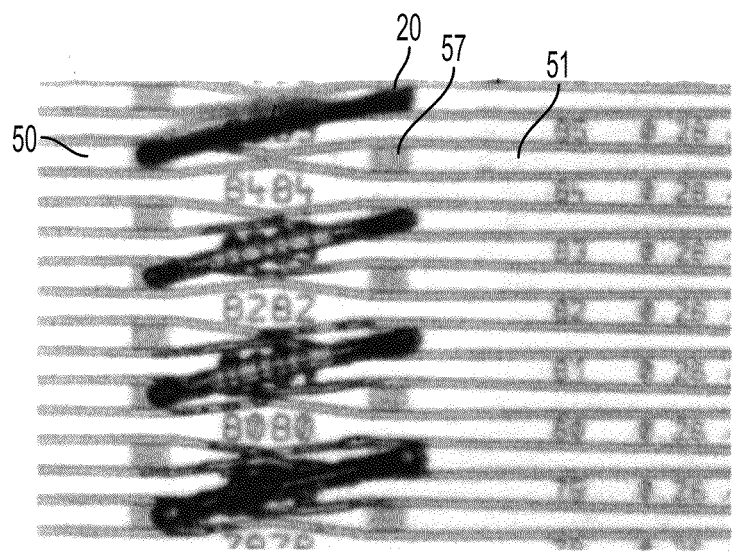

Photonic wire bonds have already been produced and experimentally tested with excellent results within the framework of the present disclosure, with the following results being obtained:

Within the framework of the initial work, a first functional photonic wire bond was realized. A lithography system by the company Nanoscribe GmbH of Germany was used for the structuring. An electron microscope recording is shown in FIG. 18(a). The references (50) and (51) designate the input and output waveguides; the reference (20) stands for the optical connecting waveguide; the reference (57) shows the grating connector by means of which the optical connection is made. FIG. 18(b) shows a light-microscopic recording of several photonic wire bonds, realized on a joint chip, in the form of freestanding structures which interconnect single-mode Nano photonic silicon-on-insulator waveguides. The connecting waveguides were produced with a direct-writing lithographic system of the company Nanoscribe and a commercially obtainable photoresist of the Su8 family (company Microchem Corp. of Newton, Mass.).

An improved photonic wire bond structure with excellent transmission properties has been realized in accordance with the present disclosure, having an insertion loss of approximately 3 dB over a wavelength range of approximately 300 nm have been demonstrated.

Although two-photon polymerization is a relatively young technology, no obstacles are seen to scale it up to mass-production environments. Writing speed can be significantly increased by using scanner-based lithography systems, and fully automated metrology techniques allow for highly precise alignment of photonic wire bonds with respect to on-chip waveguides. Photonic wire bonds allow use of materials that are well established in micro fabrication (e.g. SU8), so that no fundamental problems are expected in terms of compatibility and long-term stability.

The following articles authored by the inventors of this application and others are incorporated herein by reference in their entireties: [1] Lindenmann, et al.: 'Photonic Waveguide Bonds—A Novel Concept for Chip-to-Chip Interconnects,' Proc. Optical Fiber Communication Conference (OFC'11), Los Angeles (CA), Paper PDPC1, Mar. 6-10, 2011; [2] Lindenmann, N et al.; "Photonic Wire Bonding for Single-Mode Chip-to-Chip Interconnects," 8th International Conference on Group IV Photonics, London, England, Sep. 14-16, 2011; paper FD2; and [3] Lindenmann, N. et al.; "Photonic wire bonds for terabit/s chip-to-chip interconnects;" published at ArXiv.org on Nov. 2, 2011.

The invention has been described in detail with respect to various embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for making optical connections with optical waveguides, comprising:
    mounting the optical waveguides or a device comprising the optical waveguides, on a component carrier;
    embedding at least a partial region of the optical waveguides in a volume of resist material;
    detecting positions of the optical waveguides to be connected with reference to a coordinate system using a measuring system;
    determining a favorable, three-dimensional geometry for at least one connecting optical waveguide structure for connecting the optical waveguides to each other at predetermined connecting locations and converting the at least one connecting optical waveguide structure geometry to a machine-readable dataset;
    three-dimensional structuring of the at least one connecting optical waveguide structure geometry in the volume of the resist material using a direct-writing lithography device operating on the basis of the machine-readable dataset;
    treating the structured resist material using at least one of physical methods and chemical methods to form the at least one connecting optical waveguide structure having ends connected to respective predetermined connecting locations of the optical waveguides; and
    developing the structured resist material to remove non-exposed regions of the resist material to generate at least one freestanding connecting optical waveguide structure having a refractive index contrast between a core region and a cladding region of at least 0.01.

2. The method of claim 1, wherein at least one of the optical waveguides is a lateral single mode optical waveguide.

3. The method of claim 1, wherein at least one of the optical waveguides is planar integrated on a planar substrate and the at least one connecting optical waveguide structure lies at least partially outside of the integration plane of the planar integrated optical waveguide.

4. The method of claim 1, further including, after the treating step, post-treating the at least one connecting optical waveguide structure by one of a depositing step, a coating step, a plasma treating step, or a step of exposure to electromagnetic irradiation.

5. The method of claim 1, further including basing the three-dimensional structuring on one of a photo-chemically induced reaction, a multi-photon process or a two-photon polymerization.

6. The method of claim 1, wherein the three-dimensional structuring includes utilizing interferometry methods, including generating a three-dimensional interference pattern with an amplitude-phase modulation unit which defines a shape of the at least one connecting optical waveguide structure in the volume of the resist material.

7. The method of claim 1, wherein the three-dimensional structuring includes utilizing a laser beam and moving a focus of the laser beam in the volume of the resist material, thereby forming a structure composed of individual points.

8. The method of claim 1, wherein the three-dimensional structuring includes utilizing a laser beam and dynamically adjusting a form of a field distribution in a focal region of the laser beam via an adaptive optical unit.

9. The method of claim 1, wherein the three-dimensional structuring includes using an optically transparent element that has a defined optical interface to the volume of resist material and wherein the transparent element is part of the component carrier.

10. The method of claim 1, wherein the determining step includes selecting the geometry of the at least one connecting optical waveguide structure as a function of minimizing optical losses.

11. The method of claim 1, wherein the determining step includes selecting the geometry of the at least one connecting optical waveguide structure as a function of minimizing writing time.

12. The method of claim 1, wherein the three dimensional structuring includes configuring the at least one connecting optical waveguide structure geometry by starting with connecting locations such that no isolated or only weakly anchored partial regions are created during the writing operation.

13. The method of claim 1, wherein the three dimensional structuring includes configuring the at least one connecting optical waveguide structure geometry with individual line elements which are written along a longitudinal direction of the at least one connecting optical waveguide structure.

14. The method of claim 1, wherein the embedding step includes embedding at least a partial region of the optical waveguides in a resist material comprising one of an organic material or an organically modified polysiloxane compound.

15. The method of claim 1, wherein the embedding step includes embedding at least a partial region of the optical waveguides in a volume of resist material comprising an epoxide resin.

16. The method of claim 1, wherein treating step includes treating the volume of resist material so that the optical waveguides remain completely embedded.

17. The method of claim 4, wherein the treating step includes treating the volume of resist material so that the at least one freestanding connecting optical waveguide structure is generated, and the post-treating step includes embedding the at least one freestanding waveguide structure in a solid or liquid cladding material with lower refractive index.

18. The method of claim 1, wherein the detecting step includes detecting specific, reference points on the optical waveguides by the measuring device.

19. The method of claim 7, further including using scanning mirrors to move the laser beam relative to the sample along at least one axis.

20. The method of claim 1, wherein the refractive index contrast between the core region and the cladding region in the developing step is at least 0.05.

21. The method of claim 1, wherein the refractive index contrast between the core region and the cladding region in the developing step is at least 0.15.

22. The method of claim 1, wherein the refractive index contrast between the core region and the cladding region in the developing step is at least 0.3.

* * * * *